US011995428B2

(12) United States Patent
Vaindiner et al.

(10) Patent No.: US 11,995,428 B2
(45) Date of Patent: *May 28, 2024

(54) METHOD AND SYSTEM FOR PROVIDING IMAGE-BASED INTEROPERABILITY WITH AN APPLICATION

(71) Applicant: Nice Ltd., Ra'anana (IL)

(72) Inventors: Alexander Vaindiner, Or-Akiva (IL); Vitaly Shelest, Holon (IL)

(73) Assignee: NICE INC., Ra'anana (IL)

( * ) Notice: Subject to any disclaimer, the term of this patent is extended or adjusted under 35 U.S.C. 154(b) by 442 days.

This patent is subject to a terminal disclaimer.

(21) Appl. No.: 17/351,721

(22) Filed: Jun. 18, 2021

(65) Prior Publication Data

US 2021/0311723 A1    Oct. 7, 2021

Related U.S. Application Data

(63) Continuation-in-part of application No. 16/701,299, filed on Dec. 3, 2019, now Pat. No. 11,061,661.
(Continued)

(51) Int. Cl.
*G06V 30/414* (2022.01)
*G06F 8/38* (2018.01)
(Continued)

(52) U.S. Cl.
CPC .............. *G06F 8/65* (2013.01); *G06F 8/38* (2013.01); *G06F 9/451* (2018.02); *G06V 30/414* (2022.01); *G06V 2201/02* (2022.01)

(58) Field of Classification Search
CPC ... G06F 8/65; G06F 8/38; G06F 9/451; G06F 8/20; G06F 8/24; G06F 8/61;
(Continued)

(56) References Cited

U.S. PATENT DOCUMENTS 5,481,741 A   1/1996  McKaskle et al.
5,881,381 A   3/1999  Yamashita et al.
(Continued)

OTHER PUBLICATIONS

Notice of Allowance from U.S. Appl. No. 16/899,930 dated Feb. 10, 2022.
(Continued)

*Primary Examiner* — Jose L Couso
(74) *Attorney, Agent, or Firm* — PEARL COHEN ZEDEK LATZER BARATZ LLP

(57) ABSTRACT

A system and method for enabling graphic-based interoperability between computer executed applications. A computer system operating as a client may display a graphical user interface (GUI) including control graphic items such as buttons, text boxes, etc. A process may examine the graphical image of the GUI to determine if there has been a change over time in the GUI as displayed which updates a control graphic item. If there has been a change over time in the GUI which updates a control graphic item, an action may be taken, for example updating properties of an object construct corresponding to the control graphic item, raising an event corresponding to an object construct corresponding to the control graphic item, or communicating an event to a process.

20 Claims, 22 Drawing Sheets

Related U.S. Application Data which is a continuation of application No. 15/921,705, filed on Mar. 15, 2018, now Pat. No. 10,540,167, which is a continuation-in-part of application No. 15/416,484, filed on Jan. 26, 2017, now Pat. No. 10,133,953.

(51) Int. Cl.
  *G06F 8/65* (2018.01)
  *G06F 9/451* (2018.01)

(58) Field of Classification Search
  CPC ............... G06F 21/445; G06V 30/414; G06V 2201/02; G06V 10/50; G06V 10/46; G06T 7/13; G06T 7/60; G06T 2200/24; G06T 2207/10024; G06T 15/005; G05B 19/0426; G05B 2219/23067; H04L 65/1094; H04L 67/10
  See application file for complete search history.

(56) References Cited

U.S. PATENT DOCUMENTS

| | | |
|---|---|---|
| 6,226,402 B1 | 5/2001 | Katsuyama |
| 6,327,387 B1 | 12/2001 | Naoi et al. |
| 6,731,314 B1 | 5/2004 | Cheng et al. |
| 6,789,054 B1 | 9/2004 | Makhlouf |
| 7,024,456 B1 | 4/2006 | Simonoff |
| 7,043,529 B1 | 5/2006 | Simonoff |
| 7,366,978 B1 | 4/2008 | Jones et al. |
| 8,117,554 B1 | 2/2012 | Grechishkin et al. |
| 8,274,518 B2 * | 9/2012 | Blythe .................. G06T 15/005 345/522 |
| 8,387,048 B1 | 2/2013 | Grechishkin et al. |
| 8,433,714 B2 | 4/2013 | Mohan et al. |
| 8,924,884 B2 | 12/2014 | Bank et al. |
| 9,304,837 B2 | 4/2016 | Gallo |
| 10,664,654 B2 | 5/2020 | Marks et al. |
| 10,685,032 B2 | 6/2020 | Hopkins et al. |
| 11,074,219 B2 | 7/2021 | Yazganarikan |
| 11,645,343 B2 | 5/2023 | Zarins et al. |
| 2002/0002606 A1 | 1/2002 | Jaffe |
| 2004/0123238 A1 | 6/2004 | Hefetz et al. |
| 2004/0243931 A1 | 10/2004 | Stevens et al. |
| 2005/0091576 A1 | 4/2005 | Relyea et al. |
| 2005/0276519 A1 | 12/2005 | Kitora et al. |
| 2006/0026519 A1 | 2/2006 | Vaindiner et al. |
| 2007/0271283 A1 | 11/2007 | Maryka et al. |
| 2007/0277090 A1 | 11/2007 | Raja et al. |
| 2008/0021842 A1 | 1/2008 | Pintos et al. |
| 2008/0040655 A1 | 2/2008 | Tanaka |
| 2008/0163080 A1 | 7/2008 | Kooy et al. |
| 2008/0209348 A1 | 8/2008 | Grechanik et al. |
| 2009/0119578 A1 | 5/2009 | Relyea et al. |
| 2009/0313601 A1 | 12/2009 | Baird et al. |
| 2010/0246958 A1 | 9/2010 | Ma |
| 2011/0002547 A1 | 1/2011 | Enomoto |
| 2011/0088011 A1 | 4/2011 | Ouali |
| 2014/0082424 A1 | 3/2014 | Sanders |
| 2014/0082464 A1 | 3/2014 | Sitrick et al. |
| 2014/0089826 A1 | 3/2014 | Boyd |
| 2014/0297516 A1 | 10/2014 | Brown et al. |
| 2015/0026557 A1 | 1/2015 | Byron |
| 2015/0142418 A1 | 5/2015 | Byron |
| 2016/0026730 A1 | 1/2016 | Hasan |
| 2016/0062961 A1 | 3/2016 | Zhu et al. |
| 2016/0105328 A1 | 4/2016 | Cooper et al. |
| 2016/0140250 A1 | 5/2016 | Wang |
| 2016/0255139 A1 * | 9/2016 | Rathod .............. H04N 1/32101 709/203 |
| 2017/0116179 A1 | 4/2017 | Gagne-Langevin et al. |
| 2017/0124054 A1 | 5/2017 | Campbell |
| 2018/0024901 A1 | 1/2018 | Tankersley et al. |
| 2018/0081515 A1 | 3/2018 | Block et al. |
| 2018/0129545 A1 | 5/2018 | Beckett et al. |
| 2018/0176272 A1 | 6/2018 | Zur et al. |
| 2019/0079662 A1 | 3/2019 | Wan et al. |
| 2020/0097711 A1 | 3/2020 | Venkateswaran |
| 2020/0257848 A1 | 8/2020 | Gagne-Langevin et al. |
| 2020/0265040 A1 | 8/2020 | Jung et al. |
| 2023/0185432 A1 | 6/2023 | Rosenberg |

OTHER PUBLICATIONS

Notice of Allowance for U.S. Appl. No. 17/695,188, dated Jul. 3, 2023.
Non-final Office Action for U.S. Appl. No. 17/338,889, dated Aug. 18, 2023.
Non-final office Action of U.S. Appl. No. 15/416,484 dated May 15, 2018.
Notice of Allowance of U.S. Appl. No. 15/416,484 dated Sep. 20, 2018.
Non-final Office Action of U.S. Appl. No. 15/921,705 dated Sep. 16, 2019.
Notice of Allowance of U.S. Appl. No. 15/921,705 dated Nov. 26, 2019.
Non-final Office Action of U.S. Appl. No. 16/449,950 dated Apr. 13, 2020.
Non-final Office Action of U.S. Appl. No. 16/701,299 dated Mar. 9, 2021.
Non-final Office Action of U.S. Appl. No. 16/899,930 dated Sep. 20, 2021.
Final Office Action of U.S. Appl. No. 16/899,930 dated Nov. 29, 2021.
Office Action for U.S. Appl. No. 17/695,188 dated Mar. 14, 2023.
Office Action for U.S. Appl. No. 17/338,889 dated May 19, 2023.
Notice of allowance of U.S. Appl. No. 17/338,889, dated Dec. 1, 2023.
Final Office Action of U.S. Appl. No. 17/338,889 dated Nov. 14, 2023.

* cited by examiner

| Scene Data | Anchor Properties | Control properties |
|---|---|---|
| Name | Name | Name |
| Window Caption | Tree Path | Control Type |
| Window Class Name | Text | Shape Type |
| Process Name | Child Contours Count | Tree Path |
| Window Styles | Shape Rectangle | Shape Rectangle |
| Window Rectangle | | Parent Path |
| Threshold values | | Anchor Name |
| Minimum shape size | | |
| Window Image | | |

FIG. 8

| Control Name | Methods | Properties | Events |
|---|---|---|---|
| Frame Window | Get Text with OCR | Caption(OCR) | create, destroy |
| Button | Click | Caption(OCR) | clicked |
| Link | Click | Caption(OCR) | clicked |
| Table | Get Cell Text with OCR<br>Set Cell Text | Cell, Row | Selected<br>Text change |
| List Box, List View | Select item | | Selected |
| Tab | Select Tab | | Selected |
| Text | | Text | Text change |
| General Control | Get Text with OCR,<br>Set Text | | Clicked<br>Text change |
| Check Box | Check/Uncheck | | Checked/Unchecked |
| Radio Button | Check/Uncheck | | Checked/Unchecked |

FIG. 10

METHOD AND SYSTEM FOR PROVIDING IMAGE-BASED INTEROPERABILITY WITH AN APPLICATION

RELATED APPLICATION DATA

The present application is a continuation-in-part of application Ser. No. 16/701,299 filed Dec. 3, 2019, entitled "IMAGE BASED METHOD AND SYSTEM FOR BUILDING OBJECT MODEL AND APPLICATION STATES COMPARISON AND GRAPHIC-BASED INTEROPERABILITY WITH AN APPLICATION", which in turn is a continuation of prior U.S. application Ser. No. 15/921,705, filed Mar. 15, 2018, entitled "IMAGE BASED METHOD AND SYSTEM FOR BUILDING OBJECT MODEL AND APPLICATION STATES COMPARISON AND GRAPHIC-BASED INTEROPERABILITY WITH AN APPLICATION" which in turn is a continuation-in-part of prior U.S. application Ser. No. 15/416,484 entitled SYSTEM AND METHOD FOR ENABLING GRAPHIC-BASED INTEROPERABILITY WITH A RUN-TIME APPLICATION, filed on Jan. 26, 2017, each of which being incorporated herein in its entirety.

FIELD OF THE INVENTION

The present invention is in the field of interoperability. In particular, the present invention is directed to systems and methods for enabling graphic-based or image-based interoperability between computer systems.

BACKGROUND OF THE INVENTION

Interoperability may be the ability of a computer system or application to work with other computer systems or applications, typically without special effort on the part of the users. Although many applications exist which can expose to another application or system an external graphical user interface (GUI) for interoperability via an application programming interface (API) or a software development kit (SDK) which allows interaction with the GUI by low-level programming techniques, there exist applications which cannot be connected or have their internal events easily known by any existing technique.

An example of an application which often cannot be connected by standard API and/or SDK techniques is an application executing or running in a remote environment (e.g., in a server/client architecture). In this case, the user (e.g. using the client system) may be able to see an image of an application on the screen of the client device and perform various input operations using a keyboard and/or mouse or touchscreen, but existing application integration techniques cannot recognize user interface (UI) elements or connect to any API exposed by the application, even when such APIs exist and are available or ready to use. As such, a third party application attempting to work with or access an application may not be able to. Examples of remote environments in which this problem is prevalent include the Microsoft Remote Desktop system, the Citrix XenApp system, the PCAnywhere system, and the Oracle VM system.

Interoperability problems can be attributed to one or more of for example lack of a reliable connector (e.g. API or SDK) for an interaction with such applications; and lack of an object model exposed by GUI elements or objects (for example, buttons, list boxes, links, tables, etc.).

One prior attempt at solving the interoperability issue includes technology focused on Optical Mark Recognition (OMR), which is used with Optical Character Recognition (OCR) engines to format text while generating a specific text document. OMR also provides the ability to recognize a text document with a template designed by developers. However, OMR and similar technologies do not provide an ability to interact with an application image, among other deficiencies.

SUMMARY OF THE INVENTION

A system and method for enabling graphic-based interoperability between computer executed applications. A computer system operating as a client may display a graphical user interface (GUI) including control graphic items such as buttons, text boxes, etc. A process may examine the graphical image of the GUI to determine if there has been a change over time in the GUI as displayed which updates a control graphic item. If there has been a change over time in the GUI which updates a control graphic item, an action may be taken, for example updating properties of an object construct corresponding to the control graphic item, raising an event corresponding to an object construct corresponding to the control graphic item, or communicating an event to a process.

Some embodiments of the invention improve the underlying functionality of the computer systems on which embodiments of the invention are executed by for example allowing different executing programs to communicate, integrate, operate together, or work together, or to more efficiently do so. Embodiments of the invention may improve the technology of computer application interoperability and communications. For example, embodiments may enable the development and use of run-time solutions for integration of an application with third party applications, such as applications running in remote environments having only visual representation of the UI on a client (e.g., a customer) desktop. Application communications independent of platform, operating system or standards, and based only on a visual representation, may be achieved. Some embodiments of the invention enhance functionality of applications instantiated on client devices in a server/client architecture, which may make it possible to avoid unnecessary installation, development, or configuration of software on remote servers and client devices, thus conserving memory and maximizing processing power on such servers and devices. Such enhancements may reduce total cost and development time for applications to be run in such environments.

Remote servers provided to customers by external information technology (IT) companies may include security policies and/or physical limitations (memory usage, speed requirements, etc.) which do not allow for installation of certain applications and/or software components on these servers. Some embodiments of the invention solve this problem by providing the functionality of such applications and/or software components without requiring actual installation on such servers, and/or requiring minimal installation on client systems, which may be more accessible to a third party than the server controlling the client application. Furthermore, many applications contain components, some of them not standard, that are not accessible via existing integration technologies. Some embodiments of the invention enable access to such components, which may lower time and effort of research and development to develop connectors to support these applications by providing an out-of-the-box solution for it. Embodiments may provide a simple way to adapt or connect two pre-existing software packages. Furthermore, some embodiments of the invention may function as a universal real-time connector which may be used with any application type. Such a universal real-time connector may be independent of the application platform (e.g., the desktop, server, etc.) and even independent of any operation system.

According to embodiments of the invention a system and method for enabling graphic-based interoperability with an application executed on a remote computer remote to a local computer including a local processor, and displayed on a local display, may include, using the local processor: during a design-time mode: receiving a design-time application image and a control object located within the design-time application image; identifying an anchor for the control object; and storing the design-time control object and the associated anchor; and during a run-time mode: capturing a run-time application image displaying on the local display; identifying the anchor within the run-time application image; and identifying the control object within the run-time application image based on the anchor.

These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 8 is a scene design-time data table, according to at least one embodiment of the invention;

FIG. 10 is a control methods, properties and events table, according to at least one embodiment of the invention;

Figure 1:
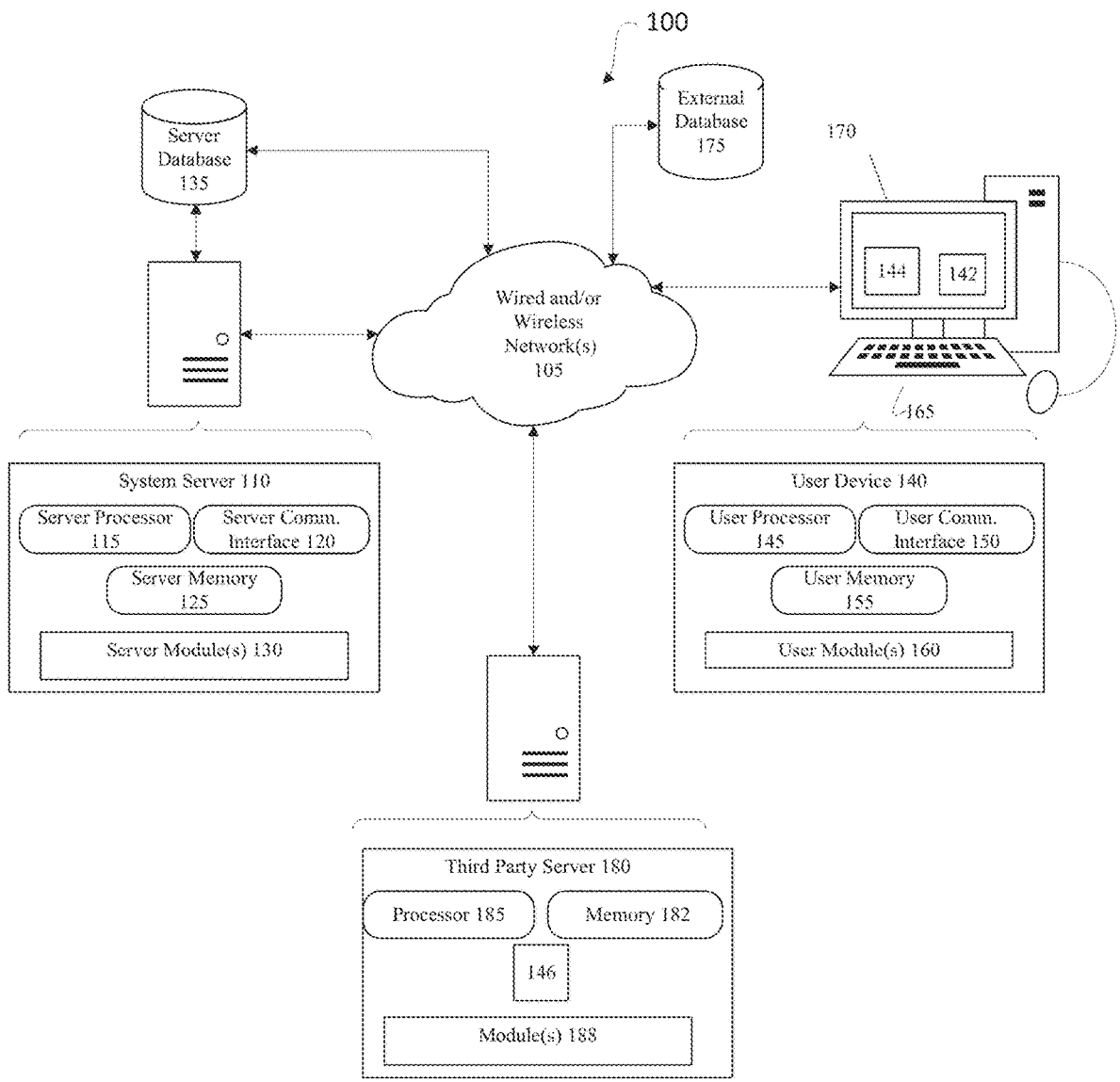
FIG. 1 is a high-level diagram illustrating an example configuration of a system for enabling graphic-based interoperability with a run-time application according to at least one embodiment of the invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention.

However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Some embodiments of the invention enable graphic-based interaction with GUI elements or controls of an application by for example using shape analysis or other graphical analysis of a graphical image of the GUI output for an application (which may be termed "application image", which may vary over time as the application state changes), which can be considered the display a human user views as produced by the application, to identify graphical objects or controls with which interaction can be enabled. Some embodiments of the invention provide a GUI object model and/or algorithms for interaction with GUI elements of an application recognized as components in an application image. Some embodiments of the invention recognize well known graphical objects and graphical object types such as, for example, application windows, GUI components, controls etc., on, e.g., a computer screen image. For this purpose, some embodiments of the invention apply a contour and/or shapes analysis of an application image, e.g., from a captured screen image.

Graphical, visual or GUI objects when discussed herein can typically include visual representations of on-screen graphics or controls, and may differ from objects in the programming sense, although programming objects can represent the visual graphics objects. Objects in the programming or software sense may be, in the class-based object-oriented programming model, a particular instance of a class and may be called for example instantiated objects, or runtime objects. Graphical or GUI objects may include for example buttons, icons, menus, cursors, text boxes, controls, frame windows, links, list boxes, tables, combination (combo) boxes, tabs, sliders, etc. Graphical or GUI objects may have corresponding instantiated or software objects. In some embodiments, objects in the programming or software sense and according to the class-based object-oriented programming model may be not actual instantiated object-oriented objects, but rather a construct used internally by an executing application to represent on-screen objects.

Some embodiments of the invention use for example two phases or modes: a design-time phase or mode for defining and collecting graphical shapes information, and a run-time phase or mode for applying the graphical shapes information to an application in real time. When referred to herein, design-time may refer to an analysis, preparatory or setup type mode or stage during which embodiments of the invention may analyze an application image (which may vary over time as the application state changes or updates, and which thus may require that the application is executed over a period of time), e.g., by applying one or more image processing algorithms, to learn about, identify, define, and/or mark-up objects in the application image such that those objects can be later identified, constructed, and/or made operable during a run-time mode or stage. In some embodiments, during a design-time mode, a scene and/or control anchors (e.g., shape anchors) may be defined, geometric relationships between anchors may be identified, GUI control types may be specifying, and controls data, anchors data and/or the application image may be collected and/or stored.

Run-time may refer to mode or stage during which the application is actually running and available for operability. As applied to some embodiments of the invention, during a run-time mode, an appropriate scene (e.g., the application state) may be recognized, for example, based on the collected design-time data, and interaction with GUI elements/objects of application may be enabled, e.g., as though a user were interacting directly with the application.

In some embodiments, as described in detail herein, during a design-time mode, actions/steps may be implemented such as for example: edges and contours detection; polygonal approximation of each contour; calculation of shape bounding rectangle(s); defining shape properties (e.g., shape anchors and/or shape controls), such as approximate points, children counts, rectangles, child contours, etc.; defining scene anchors for control shapes. defining geometric relationships between anchors to identify controls of the scene at run-time; specifying GUI control types (e.g., shape control types), such as frame windows, buttons, links, list boxes, tables, combo boxes, tabs, sliders, etc.; and calculating an image histogram for each shape (e.g., to compare shape histograms instead of image comparison). Different and/or other actions may be used.

In some embodiments, during a run-time mode, actions/steps may be implemented such as for example: recognizing (e.g., identifying, finding, etc.) the frame window shape, e.g., by comparison of the image histogram (calculated at design-time) with an image histogram (created at run-time) or an application image captured at run-time; identifying one or more shape anchors by comparison of design-time/run-time histograms and/or the maximum coincidence of child contours; identifying control shapes by comparison of design-time/run-time histograms and geometric relationships between control anchors; intercepting image paint calls (e.g., BitBlt, StrechBlt, etc.) to identify image changes or updates (representing, e.g., various application states) and provide performance optimization for remote control applications; recognizing input device (e.g. mouse/touchscreen and keyboard) hooks (e.g., via the Windows API) indicating user activity events; recognizing graphics device interface (GDI) drawing functions occurring on the client computer or terminal; recognizing Windows or other GUI system events hook and subclass window procedures, e.g., redraw messages; recognizing a timer timeout or the end of a time period; and emulating run-time controls and their various actions, properties, and events, etc. Different and/or other actions may be used.

FIG. 1 shows a high level diagram illustrating an example configuration of a system 100 for enabling interoperability with a run-time application (or simply an application), according to at least one embodiment of the invention. System 100 includes network 105, which may include the Internet, one or more telephony networks, one or more network segments including local area networks (LAN) and wide area networks (WAN), one or more wireless networks, or a combination thereof. System 100 includes a system server 110. In some embodiments, system server 110 (also referred to as a remote server) may be a stand-alone computer system. In other embodiments, system server 110 may include a network of operatively connected computing devices, which communicate over network 105. System server 110 may include multiple processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software of system 100. Server processor 115 serves to execute instructions to perform various operations relating to embodiments of the invention. Server processor 115 may be one or a number of computer processors, a central processing unit (CPU), a graphics processing unit (GPU), a multi-processor core, or any other type of processor.

System server 110 may be configured to communicate via communication interface 120 with various other devices connected to network 105. Server memory 125 may be accessible by server processor 115, thereby enabling server processor 115 to receive and execute instructions such a code, stored in the memory and/or storage in the form of one or more software modules 130, each module representing one or more code sets. Software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein.

Server modules 130 may include more or less actual modules which may be executed to enable functionalities of the invention. Server modules 130 may be executed entirely on system server 110 as a stand-alone software package, partly on system server 110 and partly on user device 140, or entirely on user device 140. Device 140 (also referred to as a local computer) may be remote from third party server 180, also referred to as a remote computer.

Server memory 125 may be, for example, a random access memory (RAM) or any other suitable volatile or non-volatile computer readable storage medium. Server memory 125 may also include storage which may take various forms. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

System server 110 may be connected to one or more database(s) 135, for example, directly or remotely via network 105. Database 135 may include any of the memory configurations as described herein, and may be in direct or indirect communication with system server 110. In some embodiments, database 135 may store information relating to user documents. In some embodiments, database 135 may store information related to one or more aspects of the invention.

User device 140 may connected to the network 105 and may be any standard computing device, for example a desktop computer, smart terminal, dumb terminal, kiosk and/or other machine, each of which generally has one or more processors, such as user processor 145 (also referred to as local processor), configured to execute code, a computer-readable memory, such as user memory 155, a user communication interface 150, for connecting to the network 105, one or more user modules 160, one or more input devices 165, and one or more output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, a local display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110. For example, system server 110 may execute a client/server, "target" or "monitored" application 142 as the server of a server/client architecture, and user device 140 may display the GUI display as controlled by server 110 and accept input to send to server 110.

In some embodiments, user device 140 may be or act as a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

A computing device discussed herein may be a mobile electronic device ("MED"), which is generally understood in the art as having hardware components as in the stationary device described above, and being capable of embodying the systems and/or methods described herein, but which may further include componentry such as wireless communications circuitry, etc. Non-limiting examples of typical MEDs are smartphones, personal digital assistants, tablet computers, and the like.

Third party server 180 may operate software or applications which may interact with or receive information from target or monitored application 142 operated via system server 110 and displayed on user device 140 via methods as disclosed herein. Since third party server 180 may not have access to, or API access to, client software operated by system server 110 and displayed in a GUI on device 140, embodiments of the invention may provide an API for third party server 180 to interact with the client software via a specially made GUI which gathers information from graphical changes on user device 140. For example, system server 110 may execute a client/server, "target" or "monitored" application 142 as the server of a server/client architecture, and user device 140 may display the GUI display as controlled by server 110 and accept input to send to server 110.

For example, third party server 180 may operate software or applications such as RT server software modules 188 (e.g. the Real-Time Process Optimization available from NICE, of Raanana, Israel) which are intended to monitor and possibly control an interaction between a customer and a human agent, where the human agent is using application 142: this interaction between RT server 188 and agent application 142 may be performed by embedded or monitoring software typically executed on the same computer that executes agent application 142 such as RT client 144. Software such as RT server software modules 188 may communicate with agent application 142 and may be remote from agent application 142, and this communication may be via RT client 144. Third party server 180 may receive information from application 142 (which may be considered a monitored application) and in some cases may send messages to or control application 142, for example send messages including suggestions to the agent regarding the customer interaction. One or more items of embedded software, monitoring software or RT client 144 may be executed by user device 140 to monitor and/or communicate with application 142 and generate events, alerts, etc., and to operate or act as software objects to allow interaction between third party server 180 and application 142. Third party server 180 may include one or more input devices and output devices such as, for example, keyboards, pointing devices, monitors, displays, speaker, printer, etc. In one embodiment RT server 188 or other software interacts with agent application 142 via embedded software such as RT client 144. In another embodiment agent application 142 is controlled by and sends input to RT client 144 with no other program controlling RT client 144. Generating, triggering or raising an event may include notifying a process (e.g., a process within or part of RT client 144, or a process external to RT client 144, such as RT server software modules 188, of the change.

Third party server 180 may communicate over network 105 and may include one or more processing machines such as computers. Third party server 180 may be any suitable computing device and/or data processing apparatus such as servers, laptops, desktops, workstations, personal digital assistants, etc. Third party server 180 may include one or more computer processors 185 which may be configured to carry out methods as disclosed herein (possibly in conjunction with processors 115 and 145) and may be one or a number of computer processors, a central processing unit (CPU), a graphics processing unit (GPU), a multi-processor core, or any other type of processor. Third party server 180 may include memory 182 storing for example data and/or code such as RT server 188. RT server 188 may include one or more software programs or applications having computer program code or a set of instructions executed partially or entirely by processor 185 for carrying out operations as disclosed herein. Modules such as RT server 188 may for example communicate with RT client 144 to receive input from and/or control or send instructions to monitored application 142, or cause application 142 to receive input, such as text inserted into a textbox, or controls selected or clicked, at the initiative and control of modules such as RT server 188. Such communication may be performed by software objects corresponding to controls within application 142. Processor 185 may be configured to carry out embodiments of the present invention by, for example, executing code or software, and may execute the functionality of RT server 188 or other modules.

Third party server memory 182 may be, for example, a random access memory (RAM) or any other suitable volatile or non-volatile computer readable storage medium and may include storage which may take various forms, and may be located remotely.

Figure 2:
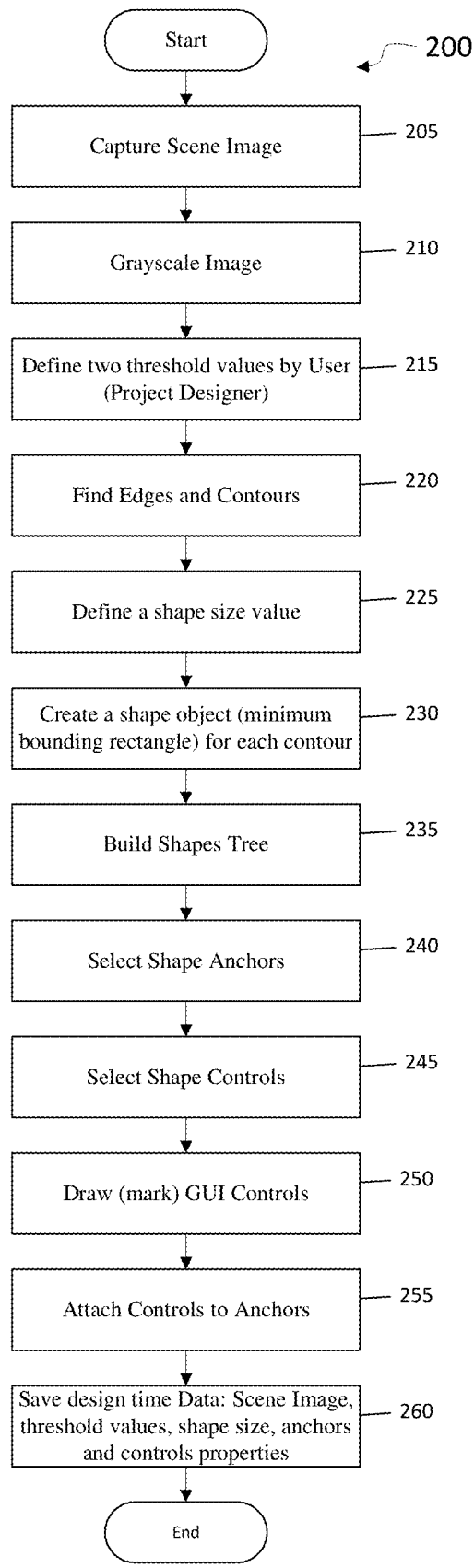
FIG. 2 is a flow diagram of a first part of a method for enabling graphic-based interoperability with a run-time application according to at least one embodiment of the invention.

FIG. 2 is a flow diagram of one embodiment for a "designer" stage, for identifying and/or defining GUI objects in an application image during a design-time learning stage, mode, or process, according to embodiments of the invention. FIG. 2 shows a learning method or process in which characteristic data models or scenes are generated and stored for later recall. Furthermore, in some embodiments, method 200 may be configured to implement one or more of the elements/features/functions of system 100.

Figure 3:
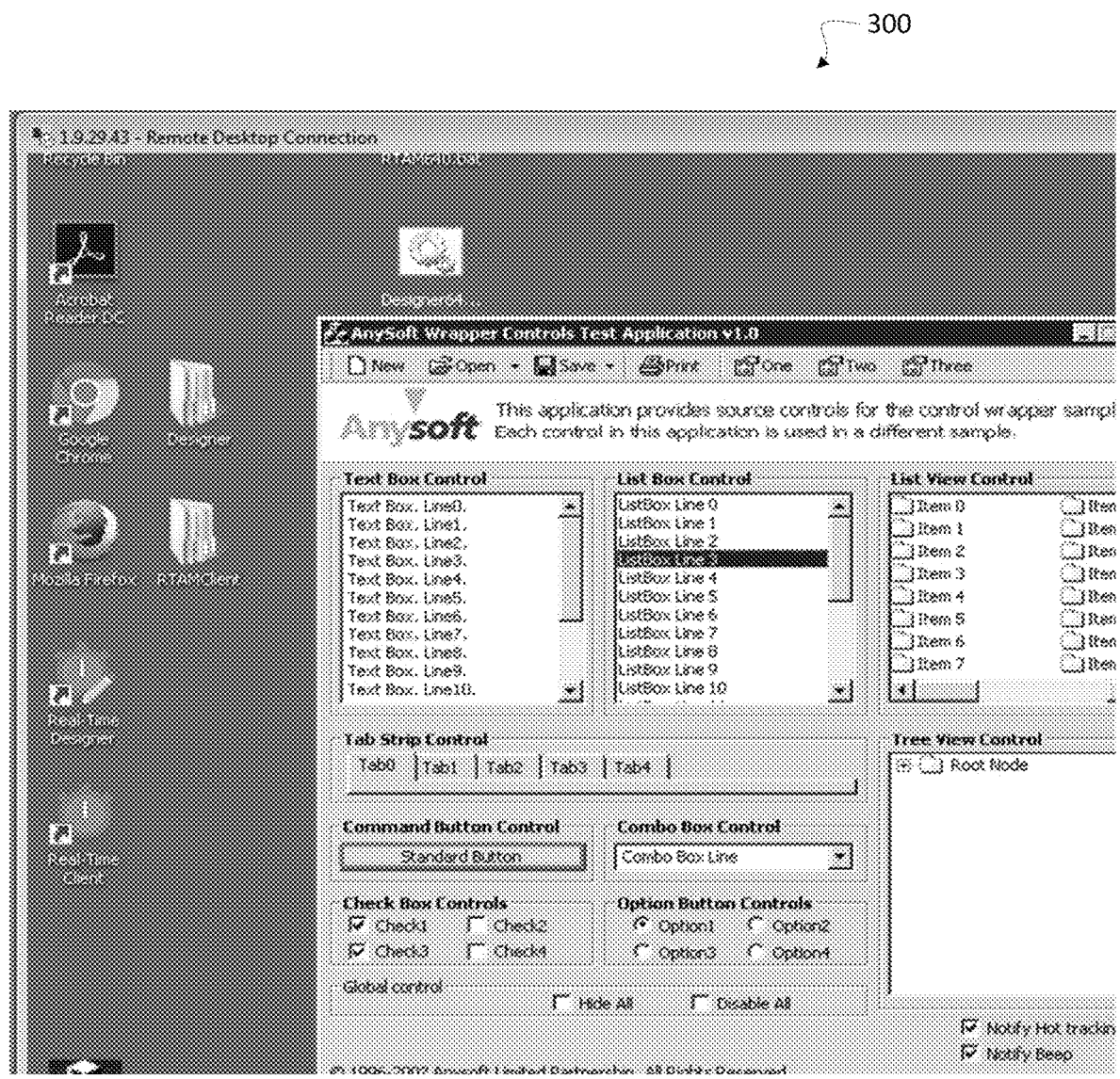
FIG. 3 is an example captured application image, according to at least one embodiment of the invention.

As with other methods described herein, method 200 may be performed on a computer having a processor, a memory, and one or more code sets stored in the memory and executed by the processor, such as but not limited to the devices depicted in FIG. 1. At step 205 a design-time application image is received. Receiving may include, for example, capturing the image of the application as a "screenshot," e.g., by use of a print-screen function or other image and/or screen capture method and/or device, or receiving a previously captured image of the application. In some embodiments, the application image may include, for example, an entire application window, a portion of an application window, an entire display including portions and/or entire windows of one or more applications, a portion of a display, etc. For example, turning briefly to FIG. 3, a captured application image 300 is shown according to at least one embodiment of the invention.

Figure 4:
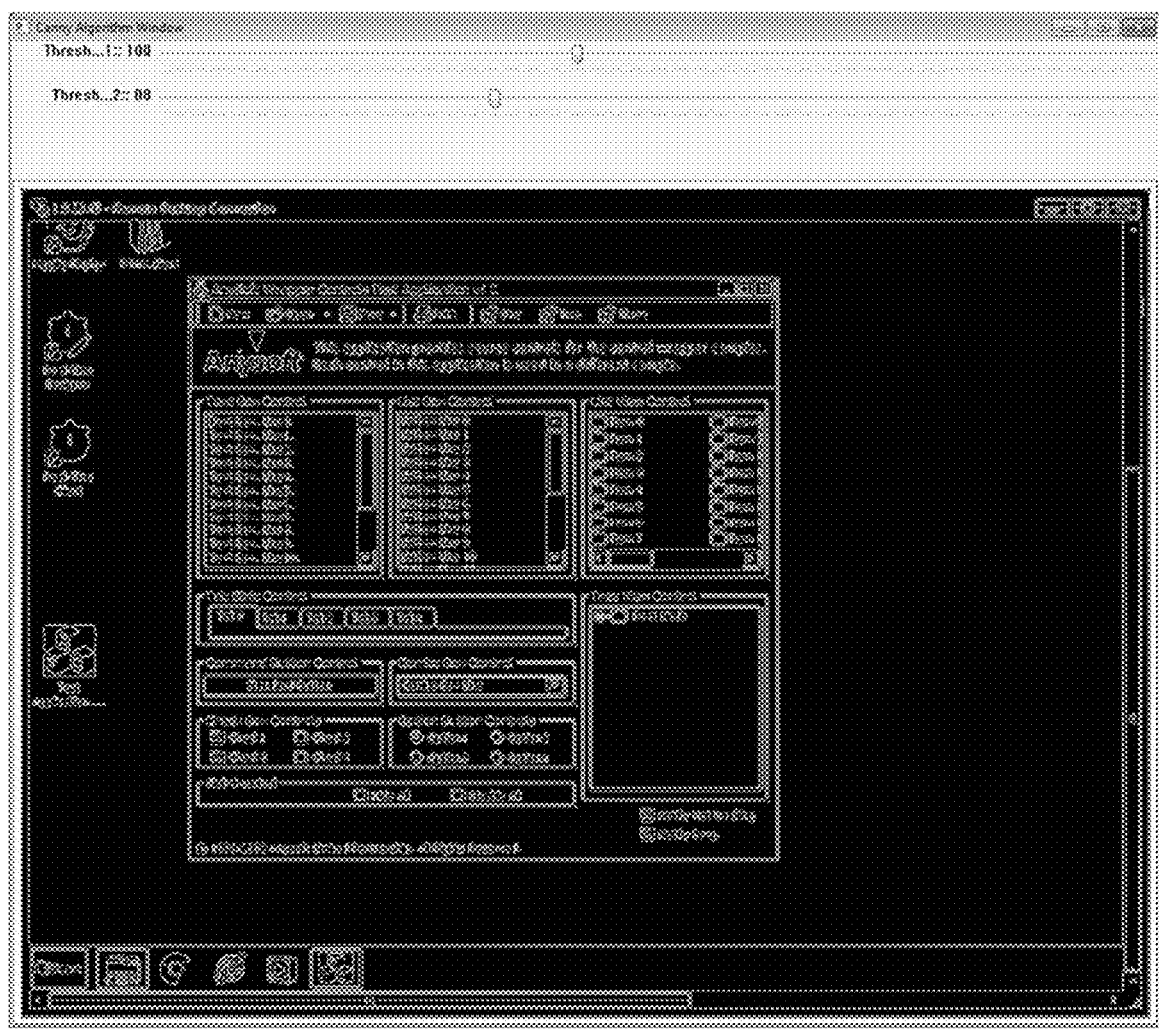
FIG. 4 is an example captured application image shown, with edges and contours, converted to grayscale, according to at least one embodiment of the invention.

At step 210, the captured/received application image may be transformed or converted to a greyscale version of the image. For example, the image may be processed with a grayscaling function (CvCvtColor) from OpenCV library, or the like. For example, turning briefly to FIG. 4, a captured application image 400 is shown, with edges and contours, converted to grayscale. In some embodiments, transforming or converting the application image to grayscale may not be performed, for example, in embodiments where color does not impact detection/identification of edges and/or contours in the application image and/or in embodiments when the application image is already in grayscale.

At step 215, one or more (e.g., two) threshold values may be defined which may impact detection of edges and contours in an image. For example, in some embodiments of the invention, the processor may receive one or more threshold values from a user to be implemented in an edge detection algorithm such as the Canny operator or the Canny Edge Detector function (CvCanny) from OpenCV library, or the like. In some embodiments, the processor may be configured to automatically determine optimal or near optimal threshold values for detection of edges.

The Canny edge detector is an edge detection operator that uses a multi-stage algorithm to detect a wide range of edges in images. Canny edge detection is a technique to extract useful structural information from different visual objects (e.g., objects visually represented in an application image) and dramatically reduce the amount of data to be processed. In some embodiments, the Canny edge detector may apply a Gaussian filter to smooth the image in order to remove noise, find the intensity gradients of the image, apply non-maximum suppression to remove spurious responses to edge detection, track edges by hysteresis, and/or finalize the detection of edges by suppressing edges that are weak and not connected to strong edges, etc.

At step 220, one or more edges and/or one or more contours in the application image may be found and/or identified. For example, in some embodiments, the processor may be configured to identify one or more edges, e.g., by executing an edge detection algorithm such as the Canny Edge Detector function (CvCanny) from OpenCV library, or the like. Furthermore, for example, in some embodiments, the processor may be configured to identify one or more contours, e.g., by executing a contour detection algorithm such as the CvFindContours function from OpenCV library, or the like. Such a contour detection algorithm may find contours using edges returned from an executed edge detection algorithm (e.g., CvCanny function). Of course, those of ordinary skill in the relevant art will understand that there are a number of algorithms which may be implemented, alone or in combination, to filter, identify, and/or detect edges (Edges detectors), for example: Canny edge detector (operator), Sobel operator, Laplace operator, etc.

In some embodiments, for example when the application image is quite complex, visual objects in the application image may be distinguished by identifying contours (and/or edges) of such visual objects within the application image. As understood herein, a contour may be defined as a curve joining a plurality of continuous points (e.g., along the boundary), having the same color or intensity. A contour may be, for example, an external outline (e.g., stroke) of a visual object that separates it from the background and/or other visual objects in the image. Algorithms known to those of ordinary skill in the art and/or as described herein may be executed in various embodiments to implement convenient methods for the detection and manipulation of image contours. For example, a FindContours function of the OpenCV library may be used for retrieving, detecting, and/or identifying contours. In some embodiments, a processor may implement an approximation method which may compress one or more horizontal, vertical, and/or diagonal segments, leaving, e.g., only their end points (for example, using a CV CHAIN APPROX SIMPLE method). Detection of edges and contours in an application image enables defining of bounding shape objects as result of this processing, as described herein.

At step 225, one or more shape size values may be defined. A shape size value may define, for example, a minimum and/or maximum perimeter (e.g., shape size) for which a bounding shape object may be generated. A bounding shape object may be defined as a bounding shape (e.g., a rectangle), for example, a minimum bounding shape, surrounding, bounding, enclosing, identifying, and/or otherwise relating to a specific or given contour, set of contours, set of one or more edges and/or one or more contours (e.g., typically an identified visual object or other shape), etc. As such, one or more shape size values may be defined in accordance with embodiments of the invention to define, e.g., minimum and/or maximum acceptable sizes for bounding shape objects to be generated as explained herein. Minimum and/or maximum shape values may, for example, prevent the system from bounding unnecessary and/or irrelevant visual objects (e.g., visual objects which are likely too small or too large to be GUI control elements or objects of interest to the user, but which nonetheless have a definable contour). In some embodiments, one or more shape values may be calculated, estimated, recommended, and/or suggested automatically by the processor. In some embodiments, the processor may receive one or more shape values as input from a user. Furthermore, in some embodiments, e.g., when too many visual objects are identified, the processor may be configured to remove visual objects/shapes with bounding rectangles less than a previously defined shape size, e.g., in real-time, for example, based on feedback from a user.

Figure 5:
FIG. 5 is an example set of generated bounding shape objects, according to at least one embodiment of the invention.

At step 230 a bounding shape object (e.g., a bounding shape such as a minimum bounding rectangle) for one or more contours, one or more edges, and/or one or more visual objects identified in the application image may be created and/or generated. For example, FIG. 5 depicts a set of generated bounding shape objects 500 is shown according to at least one embodiment of the invention. In should be noted that while in the example embodiment of FIG. 5 rectangles were generated to bound the various objects, in other embodiments other regular and/or irregular shapes may also or alternatively be generated in order to define the boundaries of various visual objects, shapes, contours, and edges within an application image as appropriate.

Figure 6:
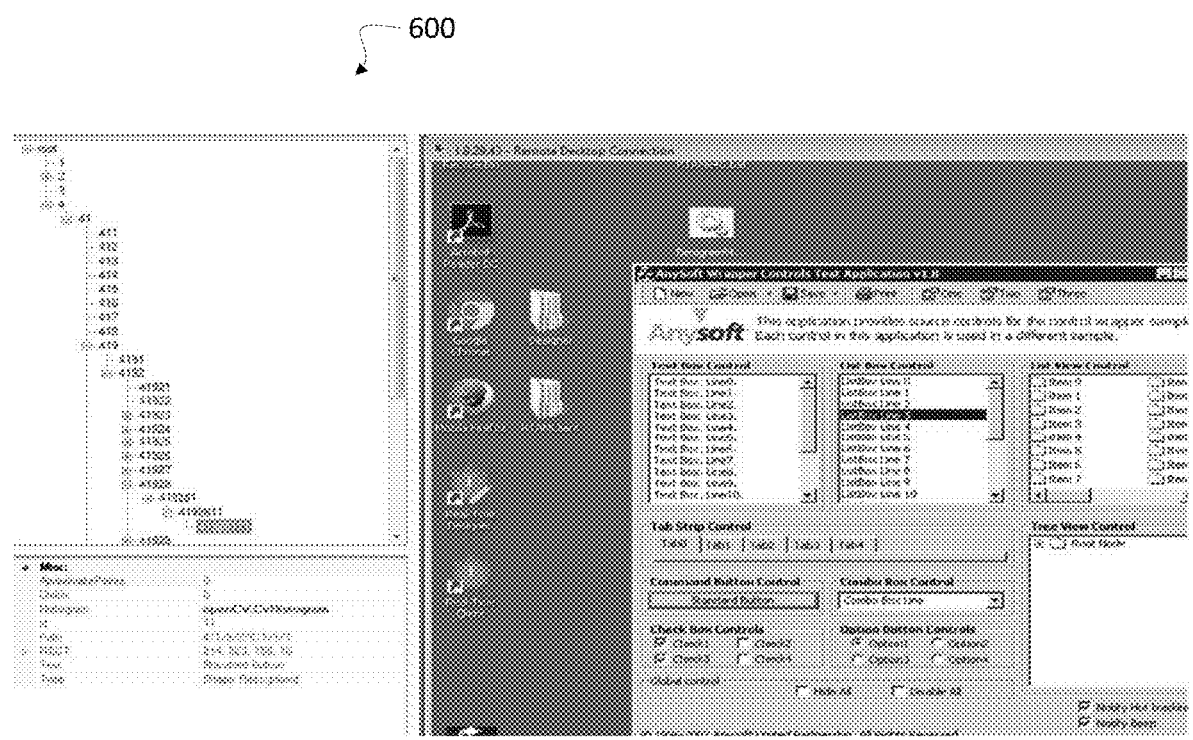
FIG. 6 is an example shapes tree, according to at least one embodiment of the invention.

At step 235 a shapes tree (e.g., a shape object tree) based on the various bounding shape objects generated in step 230 may be built. In some embodiments, for example, all bounding shape objects with a bounding rectangle larger than e.g., a defined minimum rectangle size may be placed in a shapes array. This array may be processed, and a shape objects tree may be built. For example, FIG. 6 depicts an example portion of a shapes tree 600 according to at least one embodiment of the invention.

A hierarchy of the shapes tree may be defined using an algorithm based, e.g., on coordinates nesting. Each tree node (e.g., representing a bounding shape object) may have an associated set of properties, for example: path in tree, coordinates (e.g., relative to the top left corner of the image), histogram data (as described herein), text if any (e.g., recognized using OCR), child (e.g., internal) shapes and contours, etc. In some embodiments, the shapes tree may be built in accordance with nesting coordinates. For example, each shape which encloses one or more other shapes may be considered as a parent and all shapes enclosed within may be considered as children.

In order to include histogram data in the shapes tree, in some embodiments a histogram (e.g., a design-time histogram) may be constructed based on the defined bounding shape properties of the various bounding shape objects. Histograms can be used to represent such diverse information as the color distribution of an object, an edge gradient template of an object, the distribution of probabilities representing an expected object location, etc. Therefore, in some embodiments, one or more points of interest may be identified in an application image by assigning each point of interest a "tag" consisting of histograms of nearby features.

Histograms of edges, colors, corners and so on may form a general feature type that is passed to classifiers for object recognition. In some embodiments a first histogram may be generated during a design-time mode, and a second histogram may be generated during a run-time mode, at which time the histograms may be compared to enable such object recognition, e.g., based on similarity of histogram data.

At steps 240-255, one or more bounding shape properties for one or more of the bounding shapes (e.g., bounding shape objects) may be defined, identified, associated, received, and/or selected. Such properties may include, for example, defining anchors and controls, etc. At step 240, at least one anchor (e.g., a shape anchor) may be defined, identified, associated, received, and/or selected from among the one or more bounding shape objects. An anchor may represent a visual object in the design-time application image having content or an image which remains constant from the design-time mode to the run-time mode. Each anchor may denote shape data selected to be used in the scene identification at run-time. A set of anchors uniquely determines a scene. An anchor may be for example an object based on a shape of which internal (e.g., child) content (e.g., contours) is constant and cannot be changed from design-time to run-time. For example, a shape of a button with constant text or an image on the face of the button may be defined as an anchor as the features of the button are not expected to change from design-time to run-time and can therefore be used to recognize the application as part of a scene. In some embodiments, one or more anchors may be identified, determined, recommended, and/or suggested automatically by the processor. In some embodiments, a processor may receive one or more anchor selections as input from a user.

At step 245, at least one control, also referred as control object, (e.g., a GUI control) may be defined, identified, associated, received, and/or selected from among the one or more bounding shape objects. A control object may represent a controllable object, e.g., an object that the user of the application may manipulate during run-time mode, located within the design-time and the run-time application images. A control may associate a given object with a control type for which an interaction with the control is defined within the run-time stage. For example, a control type may include one of a frame window, a button, a radio button, a link, a list box, a check box, a table, a drop-list, a combination box, a tab, and a slider, etc. Manipulating a control object may include performing an operation on the control, typically through the user interface (e.g., the GUI) using for example a mouse or a keyboard, including for example changing text, pressing a button, etc. The specific manipulation of a control may depend on the control type. For example, manipulating a button control may include selecting or pressing the button, manipulating a table may include scrolling through the table and/or changing data in a table box, etc. In some embodiments, one or more controls may be identified, determined, recommended, and/or suggested automatically by the processor. In some embodiments, the processor may receive one or more control selections as input from a user. Furthermore, in some embodiments, one or more control types for selected controls may be identified, determined, recommended, and/or suggested automatically by the processor. In some embodiments, the processor may receive one or more control type selections as input from a user.

At step 250, one or more bounding shape objects (e.g., additional shape objects) may be created on the basis of a shape (e.g., a rectangle) drawn (e.g., manually marked and/or otherwise digitally added) on the image. Furthermore, the newly created shape object may be added to the shape objects tree.

At step 255, in some embodiments, one or more controls may be attached or otherwise associated to one or more anchors. By attaching controls to defined anchors, one or more geometric relationships may be defined between controls and anchors, the data of which may be used to identify controls of a scene at run-time, as described herein. In some embodiments, one or more controls may be attached to one or more anchors automatically by a processor. In some embodiments, a processor may receive attachment selections as input from a user. Furthermore, in some embodiments, one or more geometric relationships between controls and anchors may be calculated identified, determined, recommended, and/or suggested automatically. In some embodiments, a processor may receive one or more geometric relationship calculations or selections as input from a user.

Figure 7:
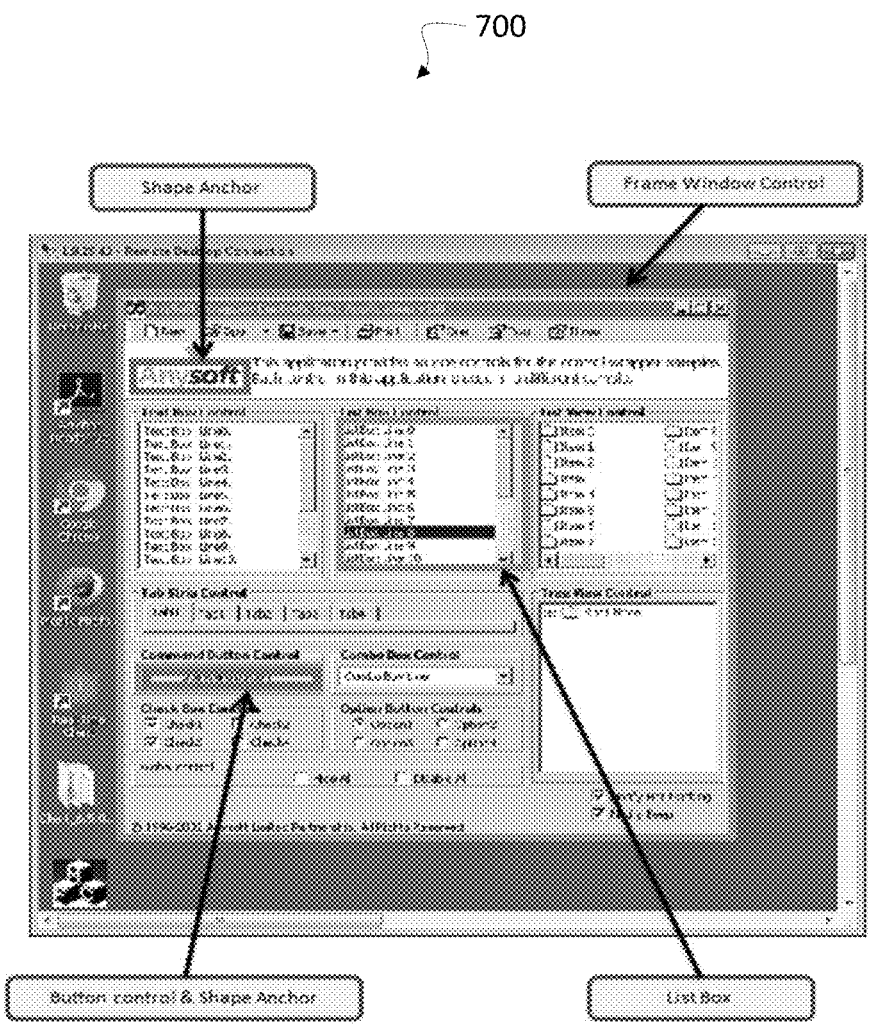
FIG. 7 is an example scene object model, according to at least one embodiment of the invention.

At step 260, data relating to one or more of the design-time application image, the one or more design-time visual objects, the one or more design-time bounding shape objects, the one or more bounding shape properties, the shape tree data, and/or the design-time histogram data may be stored, e.g., as a scene or another data object, for later recall. A scene may be for example a project object which represents an application state. It may include, for example, the captured application image, a set of anchors and/or controls, etc., e.g., defined by a user such as a project designer. A scene may provide one or more object models which may be later recalled and used during run-time to identify an application and enable the various defined controls for the application. An object model, as understood herein, may be defined as a set of properties (e.g. data stored by the control), methods (e.g. software functions that an external program may cause the control to execute), features, and/or events (e.g. software functions may be raised or fired, or the equivalent of raising or firing may be performed internal to a program, to produce output to an external program from the control) specific for an identified or given object. FIG. 7 depicts an example scene object model 700 according to an embodiment of the invention. Furthermore, as shown in FIG. 8, various scene data may be provided, recorded, stored, etc., in a scene design-time data table 800 as shown according to an embodiment of the invention. In some embodiments, additional scenes may be created, e.g., by capturing and processing additional application images as necessary. Otherwise, the design-time mode may end.

Figure 9:
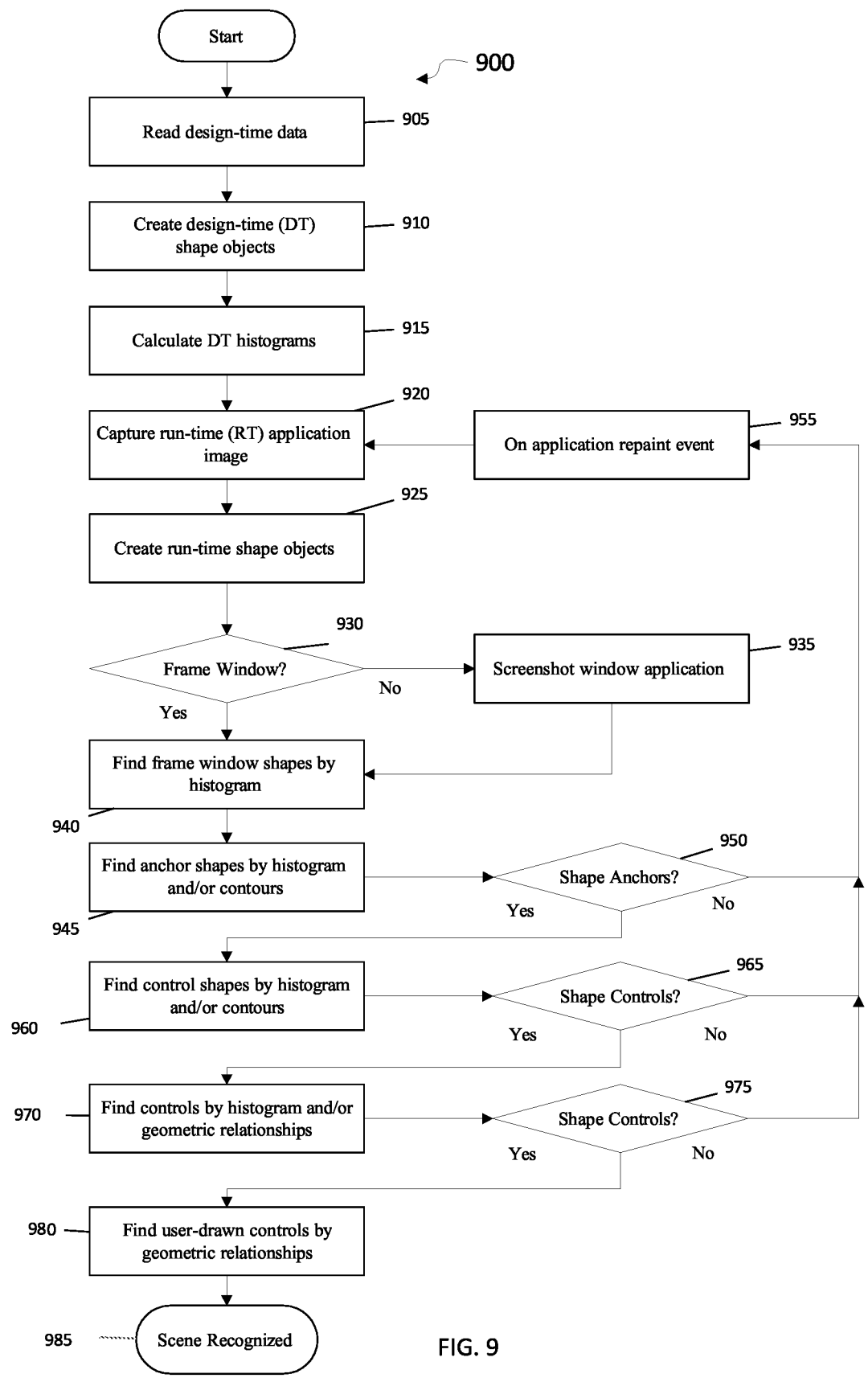
FIG. 9 is a flow diagram of a second part of a method for enabling graphic-based interoperability with a run-time application according to at least one embodiment of the invention.

To provide reliable interaction and operability with an application it may be necessary to identify the application state, particularly open windows, visible GUI elements, etc. Accordingly, embodiments of the invention enable a processor to identify the relevant application state based on the previously stored scene (e.g., scene object model and/or scene table data, etc.). FIG. 9 is a flow diagram of a method for enabling interoperability with a run-time application according to an embodiment. In particular, FIG. 9 depicts a flow diagram of a method 900 for identifying an application based on detected visual elements (e.g., GUI objects or control graphic items) of the application during a run-time stage, mode, or process, according to an embodiment. In some embodiments, method 900 may be configured to implement one or more of the elements/features/functions of system 100, or another system.

At step 905 a scene (e.g., the scene stored in step 260 of FIG. 2) containing design-time data may be received, recalled, read, and/or reloaded. In some embodiments, while a client application is starting up (e.g., loading), for example, on a remote desktop environment on a client/user device, the scene may be concurrently recalled and the design-time scene data (e.g., design-time (DT) application image, anchors and controls with DT properties, threshold values, shape sizes etc.) may be read and/or loaded. Of course, in other embodiments, scene data may be preloaded even before an application is run.

At step 910, one or more design-time bounding shape objects for implementation or use during run-time may be created (e.g., recreated). In some embodiments, one or more of bounding shape objects, a corresponding shapes tree, bounding shape properties, anchors, controls, etc., may be built, generated, constructed, and/or calculated with the same or similar algorithms, processes, methods, etc., as at design-time, described in detail with regard to FIG. 2. In some embodiments, for each anchor and/or control defined in the scene during the design-time mode, a sub-image may be extracted from the design-time application image. In some embodiments, the extraction may be based, for example, on relative coordinates of the shape object with respect to an anchor or a control. Such sub-images may be used for example, to overlay and/or identify controls and/or anchors in an application during run-time, e.g., in place of bounding objects. In some embodiments, while rebuilding a project (e.g., a scene and/or one or more components of the scene) and applying it at run-time, the application image may therefore be split into a set of pieces (e.g., saved as sub-images) corresponding to the various GUI element recognized. For example, FIG. 7 depicts a List Box, Button Control, Shape Anchor, Frame Window Control, etc., which may be extracted as sub-images, which may be used as overlays during run-time creation of bounding shape objects.

At step 915, the DT Histogram may be calculated (e.g., recalculated) (e.g., as previously described in step 235). In some embodiments, the DT histogram may be calculated using a sequential call to a library such as, e.g., OpenCV to execute functions (e.g., CvCreateHist, CvCalcHist, CvNormalizeHist) to create, calculate, and normalize the histogram.

At step 920 a run-time (RT) application image may be captured, and in some embodiments may be saved or cached. Such capturing may be caused or initiated by any of one or more change triggers, depending on the embodiment, such as a timeout or expiry of a period of time, or a detected screen change or paint command, or a user input that has the potential to change the screen. As understood herein, capturing may include, for example, capturing the image of the application as a "screenshot," e.g., by use of a print-screen function or other image and/or screen capture method and/or device, or receiving a captured image of the application, e.g., from an external image capturing device, etc.

Other or different operations may take place. In other embodiments, a processor or a process may implement different methods and/or processes to take or capture the application image at run-time, depending on the application type and/or the environment in which it is running. For example, in some applications (such as the Remote Desktop application, for example) which are drawn on the screen only by image functions, the processor may be configured to intercept image paint calls (e.g., BitBlt, StrechBlt, etc.). For other applications, in some embodiments, the processor may capture a screenshot when an application repaint event arrives. In some embodiments, the RT application image may include, for example, an entire application window, a portion of an application window, an entire display including portions and/or entire windows of one or more applications, a portion of a display, etc.

At step 925 one or more run-time bounding shape objects (e.g., instantiated objects corresponding to graphically displayed controls, or internal representations corresponding to instantiated objects) may be created, for example, corresponding to, relating to, and/or associated with, one or more design-time objects, as described herein. In particular, in some embodiments, one or more RT Image bounding shape objects and/or a run-time shapes tree may be created, built, constructed, generated, and/or calculated with the same or similar algorithms, processes, methods, etc., as at design-time, described in detail with regard to FIG. 2, e.g., on the basis of one or more identified bounding shape properties as described herein. In some embodiments, the run-time state of the application may not coincide precisely or at all with the design-time state due to resizing and/or how the application appears on the screen in other environments, in other applications (windows), etc., and therefore the set of bounding shape objects and/or the shape tree may, in some embodiments, be slightly or substantially different than those generated/created during design-time. As such, in some embodiments, for each anchor and/or control, the processor may be configured to search for appropriate shapes of the suitable size and to detect tree branch overlapped shapes. In some embodiments, one or more (e.g., typically each) of the RT bounding shape objects may be generated and/or created as an appropriate type so as to expose elements and features of the scene object model, e.g., specific for each object type. In some embodiments, these RT bounding shape objects may be overlaid with corresponding sub-images so as to replicate or otherwise visually represent the correct object type of the GUI elements for which they were created.

At step 930, in order to identify the proper scene to associate with the run-time application, an attempt may be made to identify the frame window control of the run-time application, e.g., presuming it was defined in the scene at design-time. If no application frame window can be identified, at step 935, in some embodiments, just the run-time window application may be captured, e.g., via a screenshot, e.g., to detect the necessary frame window information. If a frame window control is identified, then at step 940, one or more frame window shapes in the RT application image may be searched for, detected, found, and/or identified. In some embodiments, the frame window control in the RT application image may be searched for, possibly via its associated data, e.g., by executing one or more histograms comparison functions of DT frame window control data (e.g., collected during design-time) and RT shape histograms (e.g., using the OpenCV function CvCompareHist). The comparison result may be the array of RT shape objects whose histogram values are similar.

At step 945, one or more RT anchor shapes (e.g., anchors) may be found (e.g., detected, identified). To find RT anchors in the entire scene (e.g., in the scene model and/or in the scene data) or a portion thereof, in some embodiments, a method may again execute one or more histogram comparison functions, as described above. In some embodiments, a processor may compare design-time object data to image data collected at run-time, e.g., with or without comparing histograms, depending on the instance, e.g., by comparing contours. In some embodiments, e.g., if the contours are essentially identical, a processor may continue verification of the scene.

Anchors may contain information/data regarding contours calculated for the shape content (picture, text, lines, etc.) that are typically constant; an anchor may be for example a program or application name, a logo, etc. As such, detection of matching anchors is typically an indication that a correct (matching) scene has been identified. At step 950, if no anchors are detected, then, the run-time application image may be recaptured at step 955, for example during an application repaint event or on the occurrence of another change trigger, and the process may continue with step 925. In some embodiments, recapturing the application may resolve any mismatching and/or detection issues.

If one or more anchors are found at step 945, then at step 960, one or more control shapes (e.g., controls), may be found (e.g., detected, identified) for example, based on identified anchors. In some embodiments, controls may be searched for in the same or a similar manner as anchors. To find RT controls in the entire scene (e.g., in the scene model and/or in the scene data) or a portion thereof, in some embodiments one or more histogram comparison functions may be executed again, as described above. In some embodiments, a processor may compare design-time object data to image data collected at run-time, e.g., with or without comparing histograms, depending on the instance. However, it should be noted that controls are not necessarily constant (as they typically are with anchors), and their contours may be somewhat different, and thus controls may, in some embodiments, be more readily identified via comparison of histograms.

At step 965, if no controls are detected, then the run-time application image may be recaptured at step 955, for example during an application repaint event, and the process continues with step 925. In some embodiments, recapturing the application may resolve any mismatching and/or detection issues.

At step 970, one or more control shapes (e.g., controls) may be found (e.g., detected, identified, etc.), for example, based on previously defined or identified geometric relationships. To find RT controls in the entire scene (e.g., in the scene model and/or in the scene data) or a portion thereof, in some embodiments, for example, when one or more controls have been bound or attached to a particular anchor or anchors, a processor may identify such controls based on searching geometric relationships between controls and anchors. In some embodiments, such as when one or more controls have not been bound or attached to any specific anchors, a processor may search for and detect geometric relationships between controls and any or all anchors already identified on the scene. Of course, the processor may execute one or more histogram comparison functions as well, as described above.

At step 975, if again no controls are detected, the run-time application image may be recaptured at step 955, for example during an application repaint event, and the process may continue with step 925. In some embodiments, recapturing the application may resolve any mismatching and/or detection issues.

At step 980, in some embodiments any user-drawn controls (e.g., control shapes) may be found (e.g., detect, identify, etc.). To recognize user-drawn control shapes and their respective coordinates, in some embodiments, a processor may calculate geometric relationships between the specific control and any or all other controls and anchors found on this scene.

At step 985, e.g., when all or a threshold amount of the anchors and controls defined in the scene are recognized, the scene may be marked as recognized (e.g., identified) and interaction with the GUI of the run-time application may be enabled. For example, in some embodiments, in order to realize the object model, a processor may emulate run-time control methods, properties and/or events of the design-time bounding shape objects by, e.g., generating, constructing, assigning, defining, or otherwise enabling the one or more RT bounding shape objects (e.g., instantiated objects corresponding to graphically displayed controls or internal constructs using as a model such objects such as object constructs) such that they have the same or a similar defined set of properties, methods, features, and/or events specific for an identified or given object as those of the one or more DT bounding shape objects. For example, for input emulation (mouse, keyboard, etc.) a processor may use such functions as SendInput, SendMessage and PostMessage functions (e.g., for the Windows API). The processor may further use mouse and keyboard hooks (Windows API) to receive user activity events. For content change events a processor may check and identify contours changing in the control. As before, a processor may also intercept image paint calls (BitBlt, StrechBlt etc.) in order to change the application state. Turning briefly to FIG. 10, a table 1000 of example control methods, properties, and events is provided according to an embodiment of the invention.

Figure 11:
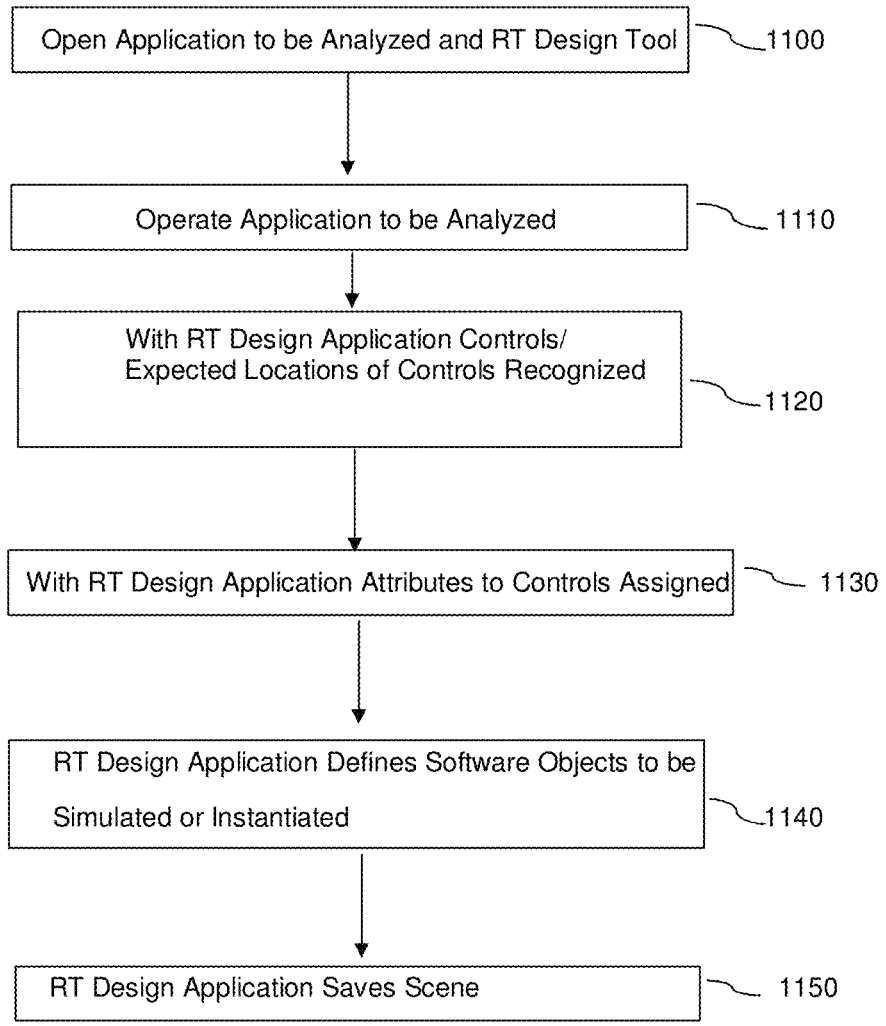
FIG. 11 is a flow diagram for a "designer" stage, for identifying and/or defining GUI objects in an application image during a design-time learning stage, according to embodiments of the invention.

FIG. 11 is a flow diagram of one embodiment for a "designer" stage (e.g. application 146 executed for example by third party server 180 or another device), for identifying and/or defining GUI objects in an application image (e.g. a client/server or monitored application such as application 142 executed on a user terminal) during a design-time learning stage, according to embodiments of the invention. Aspects of FIG. 2 may be used in conjunction with FIG. 11, and portions of the two embodiments may be combined. Application 142, shown in FIG. 1 as being executed on a client system, may also be executed on a third party system, for the purposes of making its image available to an RT design application, and for the purposes of design of RT client 144.

In operation 1100, two processes may be opened or executed on a user terminal such as third party server 180: the application to be analyzed (e.g., application 142 executed during a designer phase), and a RT design tool or application 146 operated by a designer to define for example: graphical objects or controls displayed by application 142 and to be monitored, and software objects which are to represent the graphical entities (objects, controls, etc.) of application 142. In one embodiment, the two applications may be operated side by side by the same processor, but in other embodiments the applications may be executed remotely from each other.

In operation 1110 a user may operate application 142 to operate, alter or select a control or other control graphic item displayed by the GUI of application 142, or select another GUI element of application 142. For example, a user may use input devices associated with a computer which is part of third party server 180 and click on or select a control, text box item, list item, etc. A user may cause a GUI element of application 142 to be altered, for example by typing text which appears in and thus changes or updates the appearance of a text box. A user may essentially operate application 142 to have all controls deemed relevant by the user operated and thus analyzed and defined, as per the operations below. A user may highlight or select another GUI element of application 142: for example a user may select (e.g. using a selection box or tool) an anchor of application 142.

In operation 1120, with RT design application 146, the control or GUI element operated or altered in operation 1110 may be recognized, or its expected location may be recognized, for example using tools or methods discussed with respect to FIG. 2, or other methods. A display in application 146 mirroring the GUI displayed by application 142 may indicate in highlight (e.g., a colored border) the control or GUI element operated or altered by the user in application 142.

In operation 1130, with RT design application 146, attributes may be assigned to the highlighted or recognized control operated or altered, possibly with user input. For example, a user may operate application 146 to define a recognized control as a text box, button etc., and/or may define or select a software object (e.g. as shown in FIG. 10) to correspond to the recognized control, and a user may define events, methods, and other properties for the software object. While operation 1130 may be performed with the aid of user input, all or some of operation 1130 may be performed automatically, by a processor.

In operation 1140 RT design application 146 software objects may be created or defined to be later simulated or instantiated during run time (e.g. as shown in FIG. 10) corresponding to the controls or GUI items, or may create other data corresponding to the GUI items. Such software objects may be object-oriented programming software objects. Data included in or associated with such objects may include for example an image (e.g. a graphical representation) of the control which may be used as a comparison to a run-time image of the control, and other data. If a non-control element (e.g., anchor) is operated or identified in operation 1110, it may not be the case that a software object is assigned to the element. For example, the element may be recognized for the purpose of identifying application 142 or the layout of application 142. An anchor may be used during run time for recognizing an application, recognizing a position of an application, and defining the expected other GUI elements or controls, defined by the data created at design time as existing spatially relative to the anchor. RT design application 146 may also accept user input defining software objects and may, during the design phase, provide input to controls or other elements of application 142 and view events or other changes or output occurring with respect to software objects associated with those controls.

In operation 1150 RT design application 146 may save the data created, for example as a "scene." Such data may define or control RT client 144, when it is executed. For example a scene may be compiled into a DLL used by an RT client application. In some embodiments, data created during the design phase may define how RT client 144 operates during run time, or may define or be RT client 144 itself.

Embedded or other software (e.g. embedded software or application such as RT client 144) may monitor the state of a GUI intensive client application, e.g. application 142, when the application is running. For example, RT server 188 may communicate with RT client 144 to receive input from and/or control or send instructions to monitored application 142, or cause application 142 to receive input, such as text inserted into a textbox, or controls selected or clicked, via software objects corresponding to controls within application 142.

Other or different operations may be used.

After design-time, when a client application (e.g. application 142), the application may be run at "run time" using the design-time definitions to allow third-party software to interact with the client application without direct interaction or access to the server operating the client. In order to do this, during run-time, changes or updates in the GUI display or graphical image of the client application over time may be detected. The determination of whether there is a change to detect to relevant GUI controls or other GUI aspects of interest to the third-party software may first be made on the occurrence of a change trigger, an event or message which may signal the possibility that the client image has changed in a way relevant to a control or other change. Such a change trigger may be for example one or more of a timeout or expiry of a period of time, a detected screen change or paint command (e.g. from the OS or Windows level), and a user input that has the potential to change the screen. Other suitable change triggers may be used.

For example, a first image of the display (e.g. of target, client or monitored application 142) may be stored or cached (e.g. by RT client 144), and at some point, e.g., after a change trigger, a second image may be stored or cached, the first image in this context being a prior image and the second image being the current image. This capturing may be iterative, where the current image becomes the prior image. Based on relevant changes or updates (e.g., by detected by RT client 144), a process on a client system (e.g. user device 140) communicate changes in state or messages to a third-party system, simulating a GUI. For example, events such as TextChanged may fire in response to detected changes between a first and second image. "Firing" or "raising" an event may in some embodiments be a construct as opposed to an object-oriented raising or firing, and may simply be a process occurring within, or a simulation occurring within, a program such as RT client 144.

For example, after a potential change is detected (e.g. after a change trigger) the graphical image of the GUI may be examined to determine if there has been a change over time in the GUI as displayed which updates a control or control graphic item (or a monitored control graphic item). A change trigger may cause such an examination or search for changes: for example a timeout or the end of a repeating time period may be a change trigger. A timeout or the end of a time period may be considered a change trigger in and of itself, or in combination with a comparison of a current screen image to a past or cached screen image which results in the detection of a difference between the two images. A change trigger may include the detection of keyboard input (e.g. on the client device), the detection of mouse input or another indication that the GUI (e.g. on the client device) has changed may trigger a search for changes.

As a result of this search, actions taken by or on controls or GUI elements may be detected (e.g. a button being clicked, text being added to a text box by a user or an automatic process). Based on these actions, simulated instantiated software objects (typically operated by software or application such as RT client 144) may provide output, or the properties, state or data associated with software objects or simulated instantiated objects may change (the change typically corresponding to the change in the control graphic item): for example an event may be raised, or fire (typically a simulated event), or the data or properties reflecting text in a control may change. In some embodiments, software objects are not actually instantiated, and the objects are an internal representation or fiction that RT client 144 uses for itself to access visual on-screen objects; RT client then may communicate with a process on a third-party server the text in the GUI textbox displayed by application 142 using such internal (to RT client 144) representation. In other embodiments, data for software objects may be accessible by methods or other devices: for example, a "GetText" method associated with a text box may be called by for example a process on a third-party server, and the GetText method (e.g., operated by or part of RT client 144) may return the text in the GUI textbox displayed by application 142. Simulating the functionality of the graphical control may be based on or may be performed after detecting the type of the graphical control.

One or more different methods may be used as change triggers or signals to cause an analysis of an application display for relevant changes to the GUI or graphical image. It is noted that a change trigger may be in response to a change in the application image which does not affect a control or GUI or other event of interest, and thus a change trigger may not result in any event being raised or object properties being changed. Changes may be monitored at the level of the operating system of the computer outputting the GUI display. For example, window events hooks and subclass window procedures for handle redraw messages for the display of application 142 may be accessed by RT client 144, and when it is detected, via these messages, that the display of application 142 by user device 140 (e.g., a graphics card on device 140) has changed, the display may be analyzed to determine which if any controls have changed. This may be performed by a detection of drawing commands altering the virtual window displayed on device 140 showing the GUI for software 142. Similarly, GDI drawing functions may be intercepted via RT client 144: for example a Redraw event may be raised when the target image or GUI is altered. GDI intercept may require a native dynamic link library (DLL) injection into the target (e.g. client, such as Citrix) application's memory space; registering system level breakpoint handlers for all API methods relevant for windows redraw; using an inter-process communication mechanism intended to deliver redraw event information; or the use of a created object which raises events with the relevant parameters on the occurrence of a redraw event. Input devices 165 of user device 140 may be monitored. For example, application 142 may monitor keyboard and mouse input via hooks, and upon indication that a keystroke or mouse movement or click has been made, the GUI may be analyzed for changes. A timer or timeout function may cause the GUI to be analyzed for changes every repeating time period, or if a certain amount of time has passed since the last check for changes.

One or more different methods may be used to determine changes or updates in a GUI display. Some of those methods are discussed above with respect to FIG. 9. Further methods are discussed below.

Monitoring of the GUI state and changes in the state may be based on real time difference calculation of two state application images, for example a cached, saved or prior image, and a current image. Differences may include for example data selection (e.g., background change, border around text, etc.) and content data changes or updates (e.g. change in text within a text box). To identify these changes a number of methods may be used. In one embodiment, three processes are used in sequence, each providing output to the next: an image common difference regions identification process, providing output to a filter background change region, in turn providing output to a filter data change regions process. In one embodiment, two different types of image changes may be detected and used: changes in data selection (e.g., check/uncheck a button), which can be detected by background or other changes; and changes in content or data (e.g., changing the content of text).

Applying an image common difference regions identification process (e.g., with mode dilate), GUI images (e.g. one before a change trigger, or an actual or suspected change in the screen, and one current) may be compared using black-white image of absolute differences calculations, such as using the OpenCV Function AbsDiff. A morphology algorithm may be used that smooths pixels shown as changed in the resulting difference image ("Difference Image"). The process may use an erode algorithm to obtain region rectangles of changes: rectangular subsets from the original image in which there has been a change. The Difference Image may be processed by the OpenCV Function MorphologyEx with the parameter ERODE to use an erode algorithm, then on the resulting image, contours may be found using for example the OpenCV FindContours Function. For each contour a bounding rectangle may be calculated (e.g. OpenCV BoundingRect Function). In one embodiment, rectangles that are below a size threshold, e.g., with width less than two pixels, are removed from the rectangle set thus obtained. A number of rectangles, indicating changes, or surrounding changed portions, may be thus produced.

The output of image differences processing (a set of rectangles) may be fed to background change regions identification, which may identify for each rectangle of the set of rectangles the type of change: data or content changing (which may cause the process to return "false"), as opposed to background changing (which may cause the process to return "true"). This process may recognize changes in black spots: if there are no black spot changes it may be determined that background has not changed. A process may eliminate the rectangles (input from common difference regions) without background changes, leaving only rectangles indicating data changes, in a background change regions identification process. For the remaining rectangles which indicate data changes, the previous cached image and the current image may be compared with respect to these rectangles: a sub-image pair of rectangles is compared using for example a common difference regions method. If any rectangles are output, a filter is used to subtract from the sub-images background changes, to return the data changes in the rectangles.

By creating software objects or control objects, for example having associated therewith methods, properties, and events, an embodiment may simulate an API to a client application. In one embodiment the software objects or control objects are not instantiated and executed, but rather such objects are used as a representation within RT client 144, for example an object construct. Thus, various software objects, or control objects, may be defined at design time and used internally by RT client 144 at runtime. In other embodiments such objects may be actually instantiated. These software objects may be similar to or mimic actual Windows controls APIs. A non-limiting set of GUI visual objects and corresponding software objects or control objects is described below; other objects may be defined and used.

A generic control may define events, methods and properties which all controls may inherit, according to object-oriented methods. For example, a generic control may include the properties or methods of control coordinates relative to the application image (e.g. the location of the rectangle of the control image); the actual control image (the image of the control itself cropped from the application image); certain design time properties such as the control name, control state, and what kind of control it is, its dimensions; image preprocessing which may prepare the image for OCR, such as digital noise reduction; mouse and keyboard hook settings, which may be hooks to for example the Windows SDK; and a histogram equalization method that may perform preprocessing to improve the contrast in an image.

For example, a Button or Link object may be both a visual object displayed on a GUI and a corresponding button or link software object (or object construct used within RT client 144). Each may be similar to the standard button or link object used in many GUI environments, with some additional functionality per embodiments of the invention. As with other controls or GUI elements discussed herein, each button or link object appearing on a GUI screen may have a separate internal or "instantiated" object within RT client 144 corresponding to the button or link, or a software representation or object construct. In some embodiments, each screen object may be represented, in RT client 144, as an object construct including data and description related to the on-screen object; in some embodiments such an object construct can be thought of as similar to an instantiated object-oriented object. In general, each GUI graphic item of interest may have a separate object (e.g., object construct) corresponding to it executed, instantiated or "imaginary" within RT client 144. In addition, each object or object construct may inherit standard properties, methods and events from a generic control.

Such a button or link software object may include methods (in the object oriented programming sense) of for example Click, which may calculate the control center (the center of the rectangular image of the control) and simulate a left mouse click on the control center in order to set the focus on the associated button or link with for example the SendInput command; and Get Caption to perform OCR recognition of the caption or label of the control from the control image and return the recognized text. Such a button or link software object may include events (in the object oriented programming sense) of for example Clicked, fired on a mouse button left up within the control rectangle (the area of mouse click input). Fired events may be processes that communicate occurrences to, e.g. third party software, e.g., RT server 188. Properties (in the object oriented programming sense) of such objects may include for example, enabled\disabled. Properties may be values or data available, via the relevant object, to third party software, e.g., RT server A process to determine if the object is enabled or disabled and thus determine the property enabled\disabled may include for example: creating a 'gray' image from the control image (the displayed image of the control) with a defined color (e.g. mostly gray, or a uniform gray image) for each pixel and having the same size as the control image. This gray image may be compared to a gray reference image defined by the user at design time as having the button or control enabled or disabled. At design time, a 'dtnorm' value may be calculated which is the relative difference norm for the control's design time control image or reference image and the defined color image (e.g. the uniform gray image), for example on a pixel by pixel basis. If the design time reference image is defined as enabled, and the relative difference norm for the run time control image and the uniform 'gray' image (e.g. 'rtnorm' value) is greater than dtnorm, the button or control at run time may be defined as enabled; otherwise the button or control is defined as disabled. If the design time reference image is defined as disabled, and the relative difference norm for the run time control image and the uniform 'gray' image (e.g. 'rtnorm' value) is greater than dtnorm, the button or control at run time may be defined as disabled; otherwise the button or control is defined as enabled.

The relative difference norm may be for example a number distilled from a calculation across all pixels in compared images. Calculating the relative difference norm may be performed using for example:

$$\sqrt{\Sigma_i(src1(I)-src2(I))^2}/\sqrt{\Sigma_i src1(I)^2}$$

Where a square root is calculated for a sum of each corresponding pixel for src1 (e.g. the image of the control obtained at design time or run time) less the corresponding src2 (a uniform gray image) pixel squared, divided by the square root of the sum of each pixel, squared in src1.

For example, a TextBox object may be both a visual object displayed on a GUI and a corresponding TextBox software object. Each may be similar to the standard TextBox object used in many GUI environments, with some additional functionality per embodiments of the invention. Such a TextBox software object may include methods of for example Get Text, which may perform OCR recognition of the corresponding text box displayed in the GUI control image (the control image may be the graphical image displayed on the screen showing the control, a subset of the overall image) and return the text; and Set Text, which may allow the caller (e.g., a process on third party server 180) to insert text in the corresponding text box on the GUI. For example, processes such as RT server 188 on a third-party system or RT client 144 may take some control of monitored application 142 by causing text to appear in the display of monitored application 142. RT server 188 may do this using calls to software such as RT client 144. Manipulating controls by the third-party software, e.g. executed on third party server 180, may allow for example a prompt, instructions, or advice to be given (e.g., automatically) to an agent operating monitored application 142, may allow autofill of fields, or other control of monitored application 142.

TextBox software object methods may include for example GetText (obtain the text in the control using for example OCR); and SetText and AppendText, which may use windows SendInput to set or add text (respectively) to the displayed control textbox. SetText and AppendText may use a calculation of the relevant control center and may cause an execution of a LeftMouse click (set focus) call in order to bring focus to the relevant control, and such methods may use the Windows SendInput command (or a similar command, which simulates keyboard typing), and execution of {CTRL}A, and then {DEL}(select all, and then delete). SendInput or AppendText methods may thus insert or add (respectively) text into the corresponding displayed text box control.

A TextBox software object (e.g. corresponding to a graphical control allowing input of text) may include events including Text Changed, which may fire or be raised when for example RT client 144 detects that text in the text box has changed or updated, notifying for example a process such as RT server 188 on third party server 180 that text has changed. This may be fired for example when the previous control state image stored or cached is found to differ from the current control state image in a relevant way. Such a change may be detected, for example, by calculating text changes (when presented with a set of changed areas rectangles) based on the relative difference of the current control image (typically the graphical image displayed on the screen showing only or mostly the control) with the image stored or cached, using the Filter Data Change Regions Method described above. If rectangles are not "empty" (empty indicating no change) then an event is fired.

A CheckBox (e.g., that permits the user to make a binary choice) or RadioButton (e.g., allowing input of a choice of only one of a set of mutually exclusive options) object may be a visual object displayed on a GUI and a corresponding software object. Each may be similar to the standard CheckBox or RadioButton objects used in many GUI environments, with some changes according to embodiments of the present invention. Such a software object may include a method of, for example, GetText, which may perform OCR recognition of the corresponding text displayed in the GUI for the object control image and return the text. Such a software object may include a property of, for example, checked/unchecked. Such a software object may include an event of, for example, a checked/unchecked state change or update, typically fired on a state change or upon the mouse-left-up causing the corresponding state change, e.g. from checked to unchecked or vice versa.

An algorithm to detect a checked state change (for example for use with a CheckBox or RadioButton) may obtain a bi-level (e.g., binary) image, and apply a threshold function to compare each pixel intensity value with a threshold value. Edges detection may use a Laplace operator (e.g., the Laplacian may use the gradient of images). Contours may be identified, and an approximate polygon and rectangle for each contour may be calculated. Then two regions in the CheckBox or RadioButton image may be identified: the check mark and the text. A check mark area image identified at design time (known to have a certain state, e.g., checked or unchecked) may be matched or compared with such an image updated at runtime.

A Combination Box or ComboBox object (e.g. a box containing a combination of controls, such as sliders, text boxes, and drop-down lists) may also be a visual object and a corresponding software object. Such a software object may include methods of, for example, GetText (returning text produced from OCR recognition); and Select Index (which may perform the functions of determining the location of the control center, executing a Left Mouse click (to set the focus, in order to bring focus to the relevant control) with the SendInput command to simulate a press of the down arrow in the on-screen control n times, where n is the index of selection. Methods may include SelectItem where, for an editable combo box, keyboard input may be sent for control-A (select all) then delete, and then text data and Key "ENTER" may be sent, and for a non-editable combo box only text data may be sent by keyboard simulation, followed by the enter key simulation. Such a software object may include events including Selection Changed, returning output that the selection of the object has changed or updated. This may include finding the location of the combo box item image (e.g. using a Detect Item Location algorithm); then calculation of text changes (where the text change calculation is first presented with a set of changed areas rectangles) based on a relative difference of the current state control image with the image cached, e.g. the prior image saved, using for example a Filter Data Change Regions Method described above. If the rectangles are not empty (empty rectangles indicating no change) then an event is fired.

A detect item location algorithm used with a ComboBox object may include, for example, first, obtaining a bi-level (e.g. binary) image. A threshold function may compare each pixel intensity value with a threshold value. Edges detection may be performed, for example using a Laplace operator (the Laplacian uses the gradient of images). Contour identification may be performed, and calculation of an approximate polygon and rectangle for each contour may be performed. Two regions in the ComboBox image may be identified, for example Button and Text. The selected item image may be cropped from the text area image of the control.

A ListBox object (a visual object and a corresponding software object) may include methods of, for example, SelectIndex, SelectItem and GetSelectedText. Select Index may perform the functions of calculation of or finding the control center (the center, on the screen, of the control), execution Left Mouse click (to set focus in order to bring focus to the relevant control), using a SendInput command to simulate a press of the "home" key and the down arrow (the depiction of the down arrow in the on-screen control) control button n times, to move the selection downward, where n is the index of selection. The SelectItem method may cause the simulation of an item selected in a list (e.g., third party server 180 may via RT server 188 cause a selection to be simulated, via RT client 144 in application 142). This may occur for example by extracting text with their screen or relative coordinates) by for example OCR, and retrieving the item selected by analyzing the data of the words extracted. If the item is found (e.g. if the text on the screen matches the expected text for the item to be selected) then the appropriate mouse click may be simulated (as discussed elsewhere) to select the item in the relevant application. The GetSelectedText method may return the text selected, possibly using a Selected Item Detection algorithm (discussed below) or another suitable algorithm. The Item Selected event may fire if it is determined that the item selected is different than the previously selected item; this may be detected by detecting changes in the text background color.

The Selected Item Detection algorithm discussed above may include for example creating a Histogram Equalization of the control image; performing edges detection with for example a Canny edge detector; using a Hough transform or other suitable technique for finding horizontal lines; identifying two regions in the ListBox Image, for example List box and Scroll bars areas; processing a selected rectangle with Background Change Regions Identification Method (discussed elsewhere herein), and finding lines. Then, cropping may be performed on the sub-image of the ListBox Item selected from the list box control image.

In order to control or receive input from any region of the GUI display, beyond those specified by controls, for an application (e.g., application 142), in one embodiment, any region of the GUI display or application image may be considered to be part of a Generic Control, which may have a corresponding software object. A Generic Control software object may include and fire control actions or events such as Click, Double Click, Get Text and other appropriate events to cause events on the screen of a monitored application. Such an object may include a set of identification attributes common for all other controls on the screen, as in some embodiments all controls inherit generic properties, methods and events from a common control. Such a software object may include methods of, for example, Get Text, which returns text obtained by for example OCR recognition from the control image; SendInput, which may create or synthesize keystrokes, mouse motions and clicks; and Scroll, which may for example call a Raise Mouse click function on scrollbars or emulate 'Page Up/Down', 'Up/Down' keystroke. In order to determine the location of scroll bars and scroll bar buttons, a Scroll Bars Location method or algorithm may be used. A scroll bar software object may include events of, for example, Mouse Clicked, which may fire on the occurrence of a Mouse Left Button up in a control rectangle.

A "Scroll Bars Location" algorithm, to determine the location of a scroll bar, may be used in conjunction with or as part of a Generic Control. Such an algorithm may include, for example performing a histogram equalization of the control or GUI image; performing edge detection using for example a Canny edge detector; using a Hough transform or other technique for finding horizontal and vertical lines; and identifying scroll bar buttons areas in the GUI or control image, depending on the direction of the scrolling.

At runtime any desktop application may be identified by its frame window. A visual display on an agent's monitor (e.g. on user device 140) may include a number of windows unrelated to the monitored or client application (e.g., application 142); further, the monitored or client application may appear within a "hosting" window (e.g. a Citrix window) on the agent's monitor. While a window may be found using its "handle" or other known processes using windows, this does not apply for third party software which has no access to the "hosting" window (e.g. a Citrix window) messages. If the monitored application is running in a remote desktop environment, its frame windows cannot be recognized by regular window recognition methods. Thus, a monitoring process such as RT client 144 may be able to find the hosting window (surrounding the monitored application image) easily using e.g. its window handle, the typical API may not be available for the monitored application. The monitored application's "frame window" may need to be identified within the hosting window using its visual, graphical, image. For this purpose, an object called Frame Control (which can be considered as Virtual Window) may be instantiated (as with other objects, "instantiated" may be the equivalent of a virtual construct used in a monitoring process). The frame control object may contain all controls and anchors defined for the application and may be found or identified by anchors and controls contained in it. Anchors may be visual aspects of the client program that do not change, such as the title of the program.

A Frame Window object may represent the monitored application and include methods such as Get Caption, which may use OCR to recognize the caption (e.g. the text area at the top of the application frame, or the topmost text) of the image. As part of Get Caption, caption and buttons locations may be searched using for example a Hough Transform technique for finding horizontal and vertical lines. A Minimize method may simulate a left mouse click with the SendInput command on the window's minimize button to minimize the client window, and a Maximize command may simulate the left mouse click with SendInput command on maximize button to maximize the window. A Close method may simulate a left mouse click with the SendInput command on close button. A Bring To Front method may bring the application window to the front if other windows are over the frame window. A Bring To Front method may determine if the application is an icon, and if so the method may set the focus on the icon, then execute or simulate an Alt-Tab keystroke which may show a list of application icons. A screenshot image may be obtained, and the icon location may be found within the image. A mouseclick may then be simulated to maximize the client application. If the Bring To Front method determines the application is not an icon, the design time image may be compared to the current frame image, and if the features match, a mouse click may be simulated to bring the client application to the front.

A frame window object may include properties such as icon, which is the Application image icon, which may be the icon (small visual representation) of the client application when it is minimized, and its icon image appears on the screen.

A frame window object may include events such as mouse clicked which may fire event on Mouse Left Button up in the control rectangle.

Figure 12:
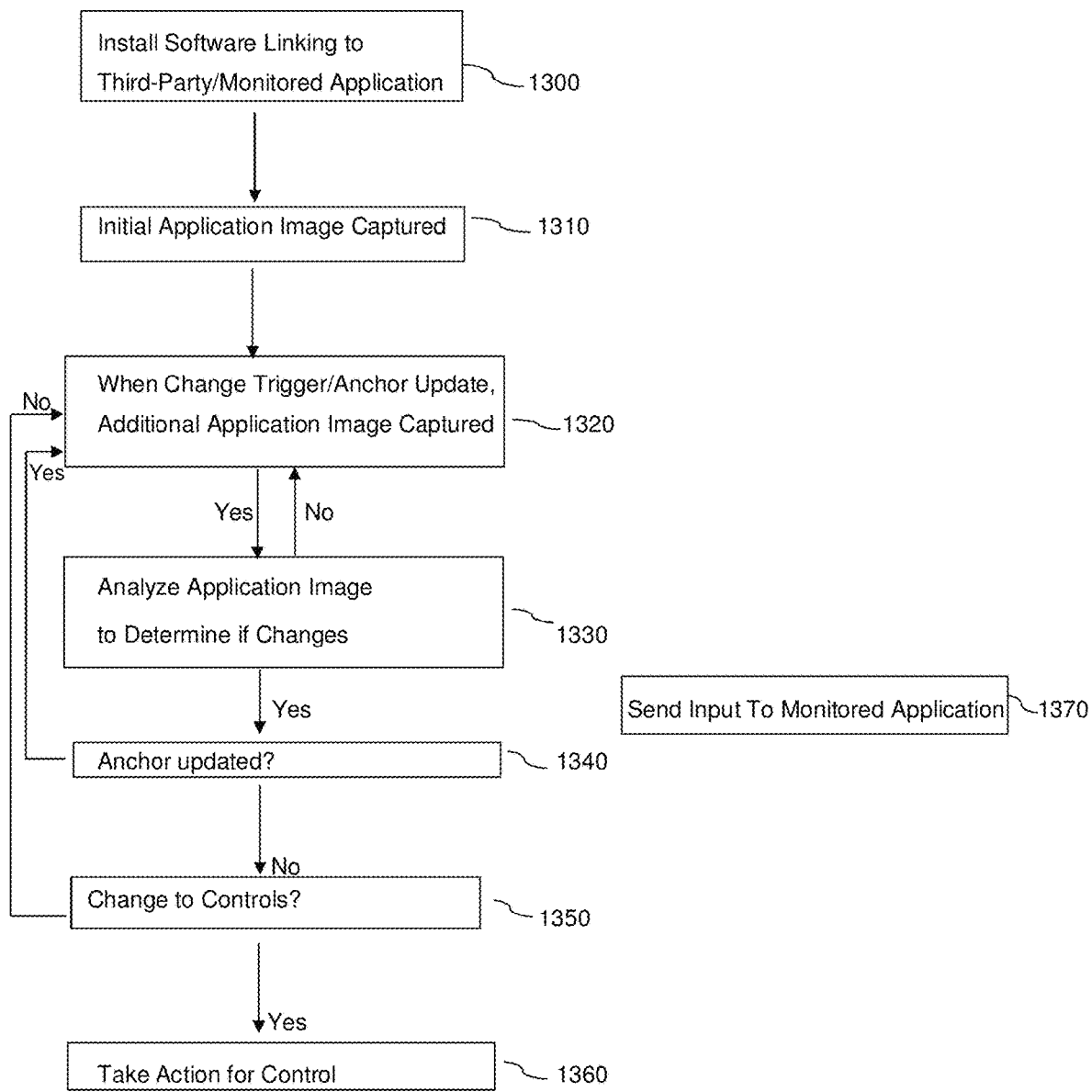
FIG. 12 is a flowchart depicting the operation of an RT client application operated side by side with client/server or monitored application on a user terminal, according to one embodiment.

FIG. 12 is a flow diagram of a method for enabling interoperability or an API with a run-time application according to an embodiment of the invention. Elements and operations of the embodiment of FIGS. 12 and 9 may be used together if appropriate, and may be used with components of FIG. 1, or another system. In operation 1300, software linking to or communicating with a third-party application (e.g., a third party application operated on third party server 180) may be installed on a user device (e.g., user device 140). For example, RT client 144, e.g. embedded software, may be installed and executed on a user device to monitor and communicate with target or monitored application 142, and to provide an API from monitored application 142 to RT server 188. Target or monitored application 142 may be considered a computer executed application operated on a computer system, and RT client 144 may also be executed on the same computer system to examine the monitored application image or GUI produced by or displayed by the target or monitored application. In one embodiment, the computer executing a remote, third party program (e.g., RT server software modules 188) and the computer executing the agent application 142 may be remote from each other, and the two applications may communicate via RT client 144.

RT client 144 may take as input a scene. In some embodiments, this may be done by compiling a scene (containing for example information regarding control images and controls) into a DLL, which may be installed on the user device 140 on which an RT client 144 executes, and the RT client 144 may access the DLL to locate and provide the interface with the objects defined by the scene. For example, a native DLL may be injected into the target application memory space; system level breakpoint handlers for all API methods relevant for windows redraw may be registered on a user device hosting the target application; an inter-process communication mechanism may be created intended to deliver redraw event information to for example software such as RT client 144 or to the third party software intended to receive the redraw information; and/or an object may be created at design time representing the relevant API which raises events with the relevant parameters for RT client 144 or to the third party software intended to receive the redraw information. The embedded software may be defined by or controlled by design time data, such as a "scene" as discussed elsewhere herein, which in some embodiments may define the actions of RT client 144 by being compiled into a DLL which is used by RT client 144.

In operation 1310, an initial application image, graphical image, or GUI display may be captured, an application image scene may be recognized, e.g. among the various windows on a received image display, the target client application image may be found, and an application image, graphical image, or GUI display may be captured and cached or stored for comparison with an image captured in the future. FIG. 9 depicts an example embodiment for such application image scene recognition. Such recognition may be performed both at start up and also if it is determined that an anchor has changed.

In operation 1320 on the occurrence of a change trigger or an indication that a screen change significant or relevant to an API may have occurred, or in the event that it is determined that an anchor was updated, an additional application image, graphical image, or the GUI display for the monitored application is captured and stored or cached. The image captured in operation 1320 may be considered the current image, and the image captured previously (e.g. in a previous operation 1320 or initially in operation 1310) may be considered the prior image; over time or iterations the current image may become the prior image. A change trigger may be for example some event or message that indicates a screen or image change has taken place that might be relevant to the API or controls on the screen. Such a change trigger can be for example one or more of the occurrence of the end of a time period or the expiration of a timer, the detection of keyboard, mouse, touchscreen or other input which may cause the change in a screen image, the capture or interception of an appropriate operating system or graphics system message, or the indication that the GUI or client display has changed. Certain embodiments may use only one of these types of change triggers, and other embodiments may combine more than one of these change triggers, and capture an image on the occurrence of any such change trigger. Other change triggers may be used.

For example, a change trigger may be the receipt by RT client 144 of a message related to a window events hook and subclass window procedure for handle redraw messages, possibly obtained from the graphics card on the client computer operating RT client 144. A change trigger may be the receipt by RT client 144 of a message intercepted from GDI drawing functions. A change trigger may be the receipt by RT client 144 of a message intercepted from monitoring keystrokes and mouseclicks, or other inputs (e.g., a press on a touch screen) on the target client computer. In other embodiments other processes, such as processes on a third-party server, may receive the change triggers.

An application image, graphical image, or the GUI display provided by a monitored application, such as application 142, may be captured or obtained, typically by monitoring software such as RT client 144. For example, a screenshot may be obtained. The application image, graphical image, GUI display, screenshot or screen image may be saved or cached for comparison with a future obtained screenshot or screen image. Typically only the image of the terminal or remote client hosting window (e.g., Citrix) is captured, as opposed to the entire image displayed on the client computer.

In operation 1330 the graphical image (e.g., the current image) of the monitored GUI may be analyzed or examined (e.g. by comparison with the prior or immediately-in-time prior captured, cached or stored image) to determine if there has been a change or update over time (e.g. by comparing the image to a previously cached image). If there is no update the process may return to operation 1320 to wait for another trigger or change event. If there is an update the process may proceed to operation 1340.

In operation 1340, if there was a change, it may be determined if an anchor was updated or changed. If it is determined that an anchor was updated, this may indicate that the change in image was for example the client application being moved, minimized, maximized, etc., and the process may move to operation 1320 to capture an image. If it is determined that an anchor was not changed, the process may move to operation 1350.

In operation 1350 the graphical image (e.g., the current image) of the monitored GUI may be analyzed or examined (e.g. by comparison with the prior or immediately-in-time prior captured image) to determine if there has been a change or update over time to controls (e.g. by comparing the image to a previously cached image), or a change over time that affects the API or the relevant monitored controls or other aspects of the client software, or since the last time the image was examined, in the GUI as displayed. In particular, examination may determine if there was a change which updates a control graphic item, or a monitored control graphic item, e.g. a change in the visual depiction of a graphical control. This may be performed, for example, by embedded software (e.g. RT client 144) installed on a client device. In some embodiments, when determining if a change occurred that affects a control, for each control, a template image determined at design time may be matched to the control images during runtime to locate each control.

If there has been no change over time, or if there is no change to control graphic items, or to monitored control graphic items, the process may wait for another trigger, e.g. iterate (operation 1320).

If there has been a change over time, or a change or update to control graphic items, or to monitored control graphic items, the process may in operation 1360 take an action with respect to the control graphic item(s) which have been determined to have changed or updated since the last image was obtained. An action may include, for example, updating or changing properties (e.g., object oriented properties accessible by querying the instantiated object, or simply data associated with an internal representation ("object construct") of a screen object) of a software object or instantiated object, or an internal representation, associated with or representing the changed control graphic items, or raising or executing an event (e.g., an object-oriented event, a function which sends a message on certain conditions where the event source—e.g., the control software object—sends a message via an event to a listener or event handlers—e.g. the third-party software) or otherwise sending a signal or message corresponding to the software object. Raising an event may include notifying a process (e.g., a portion of RT client 144, or a process external to RT client 144, such as RT server software modules 188, of the change. For example, an instantiated object or an internal construct (e.g. object construct) associated with the control that has been changed or updated may fire an event or otherwise send a message. The event may communicate information, such as the occurrence of a mouseclick or screen touch, a change in state of a window, or the change to text, to the third party application. For example, RT client 144 may communicate state changes of application 142 to a third party application executed on third party server 180, via network 105. Ways of communicating the alteration of the properties of a visual object may be used other than object-oriented event or properties techniques.

The process may continue by waiting, e.g. iterate (operation 1320), for the occurrence of a change trigger or an indication that a screen may have changed in a way relevant to a GUI.

At any point in the process of FIG. 12, in operation 1370, a third party application may affect the state or provide input to the monitored application. For example, a third party application may send a message to, call a procedure or execute a process, in order to gather information from or change the state of the monitored application. This may be done by an object oriented method call, but may be done by other software methods. For example, an application executing on third party server 180 may cause a message to a human agent to appear on the GUI output of application 142 via making a method call to a control (e.g. to an instantiated object or an internal construct associated with the control) of RT client 144. Other or different operations may be used.

Figure 13:
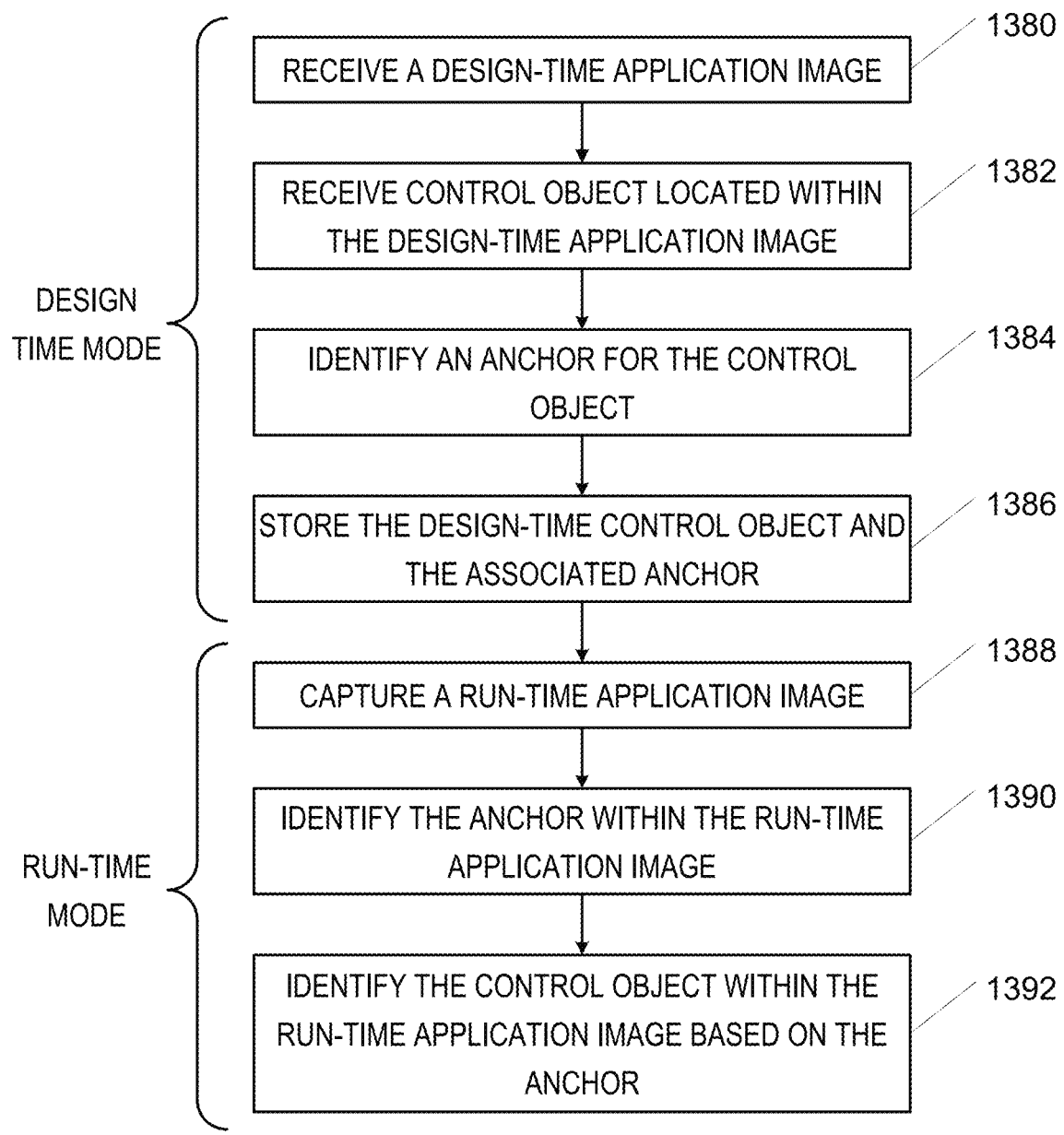
FIG. 13 is a flowchart of a method for enabling graphic-based interoperability with an application executed on a remote computer, remote to a local computer including a local processor, and displayed on a local display, according to embodiments of the invention.

Reference is now made to FIG. 13 which is a flowchart of a method for enabling graphic-based interoperability with an application executed on a computer (e.g., system server 110)

remote to another computer (e.g., user device 140) including a local processor (e.g., user processor 145), and displayed on a local display (e.g., output devices 170), according to embodiments of the invention. While in some embodiments the operations of FIG. 13 are carried out using systems as shown in FIG. 1, in other embodiments other systems and equipment can be used. According to some embodiments, the operations of FIG. 13 are carried out using the local processor.

According to some embodiments, operations 1380-1386 may be performed as a preparation step during a design-time mode. In operation 1380, the local processor may receive a design-time application image, e.g., similarly to step 205. In operation 1382, the local processor may receive a control object located within the design-time application image, e.g., similarly to step 245. For example, the local processor may receive the control selection as input from a user. In some embodiments, the control may be associated with a control type. For example, the control type for the control may be identified, determined, recommended, and/or suggested automatically by the local processor and/or the processor may receive a control type selection as input from a user. In operation 1384, the local processor may identify or determine an anchor for the control object. According to some embodiments, identifying the anchor for the control object may include selecting an image of text or icon that is located inside a bounding shape object that defines the control or is outside of the bounding shape object that defines the control and nearest to (e.g. on the display or screen) the bounding shape object that defines the control. In operation 1386, estimated location of the anchor in the design-time application image may be stored. According to embodiments of the invention, geometric relationships between a control and the anchor may be calculated or measured and stored as well. For example, the location of the anchor with relation to the location of the control may be measured or identified and stored. Thus, when the anchor is later identified during run-time, the location of the control relatively to the anchor may be retrieved and the control may be identified in the run-time application image, and possibly used to manipulate the control during run-time.

Figure 14:
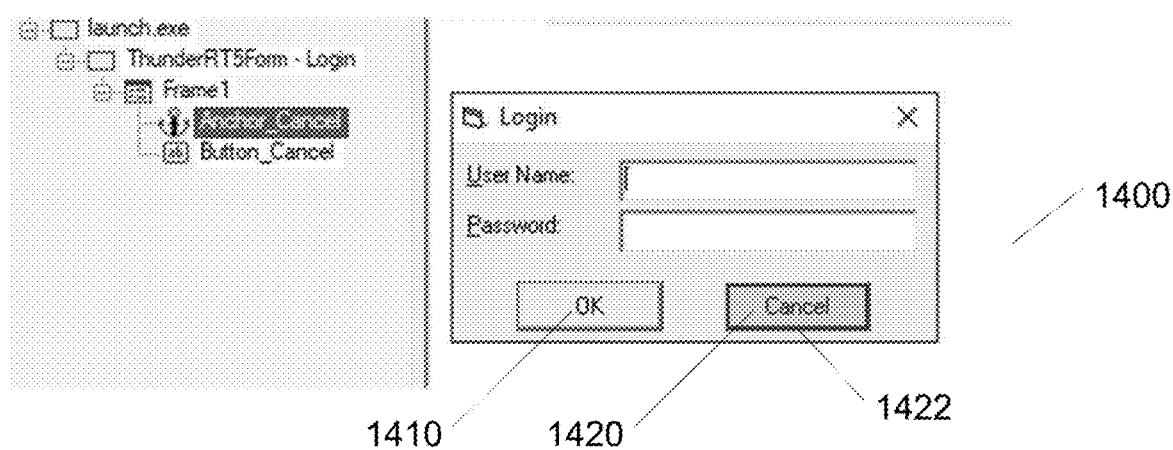
FIG. 14 depicts a part of a design-time application image with an OK button control, cancel button control, and an anchor identified for the cancel button control, according to embodiments of the invention.
Figure 15:
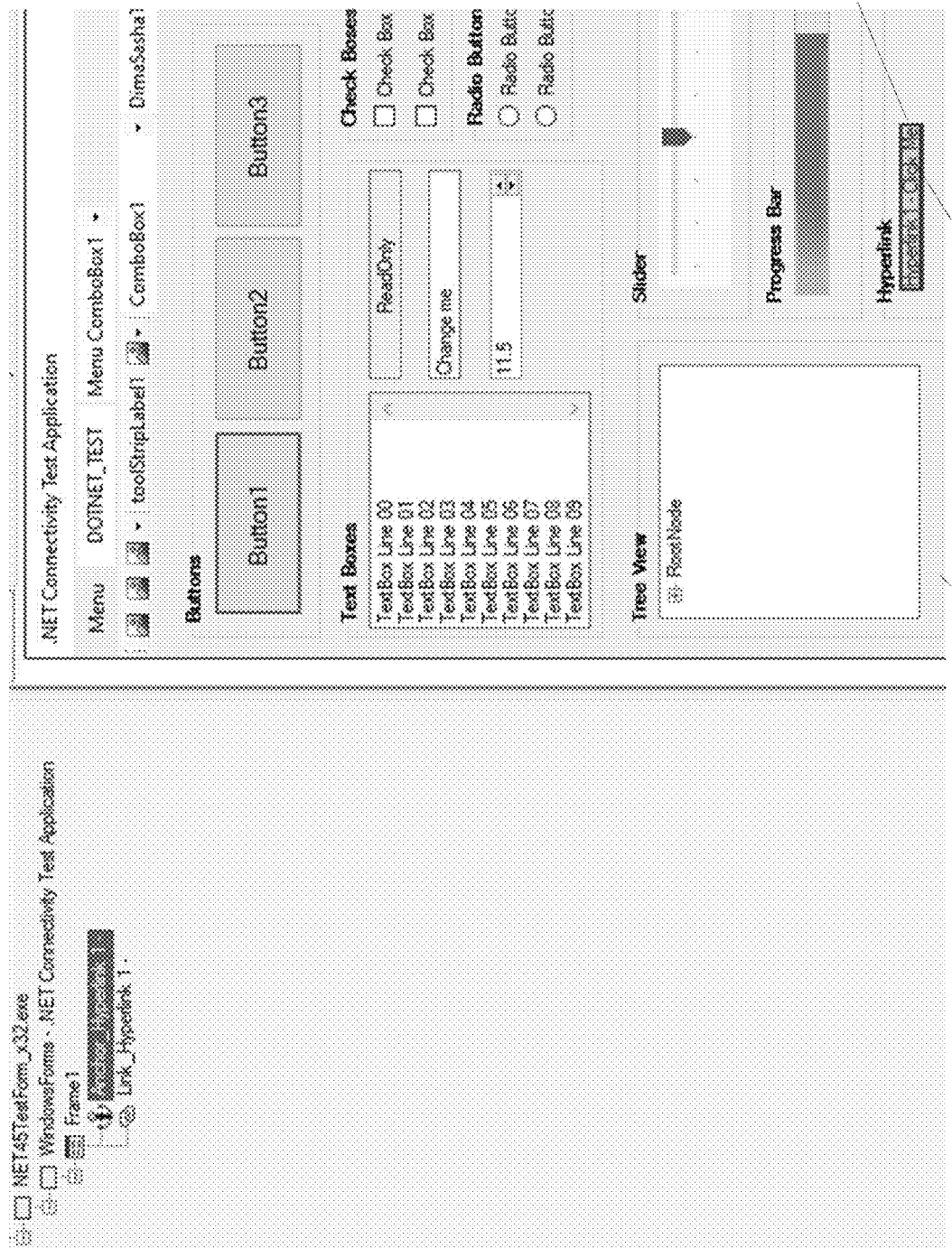
FIG. 15 depicts a part of a design-time application image with an example of a link control, and anchor identified automatically for the link control, according to embodiments of the invention.

For example, identifying by the processor an anchor for a control object that is one of a button or a link may include selecting a content image located inside a bounding shape object that defines the control, e.g., a bounding rectangle or another shape. A content image may include graphics or content located inside a bounding shape object, e.g., a bounding shape object that defines the control or a bounding shape object that is nearest to the control on the application GUI, e.g., icon, or text. It may be assumed that the graphical content of the anchor would not change from design-time mode to run-time mode. According to some embodiments, an image of the graphical content of the anchor is stored as an anchor. Thus, when the anchor includes text, then according to one embodiment, an image of the text may be stored as the anchor. For example, FIG. 14 depicts a part of a design-time application image 1400 with an OK button control 1410, a cancel button control 1420, and an anchor 1422 identified for the cancel button control 1420, according to embodiments of the invention. In this example, anchor 1422 is a bounding rectangle. Thus, an image including the word "Cancel" as it appears on the GUI of the design-time application image 1400 may be stored and later used as anchor 1422. FIG. 15 depicts a part of a design-time application image 1500 with an example of a link control 1510, and an anchor 1512 identified automatically for link control 1510, according to embodiments of the invention. For example, when link control 1510 is pressed during run-time mode, the Gmail application may open. In this example, anchor 1512 identified automatically for link control 1510 is a bounding rectangle of the graphics of the link as it appears on design-time application image 1500, e.g., the graphics of the phrase "Hyperlink1—Click Me".

Figure 16:
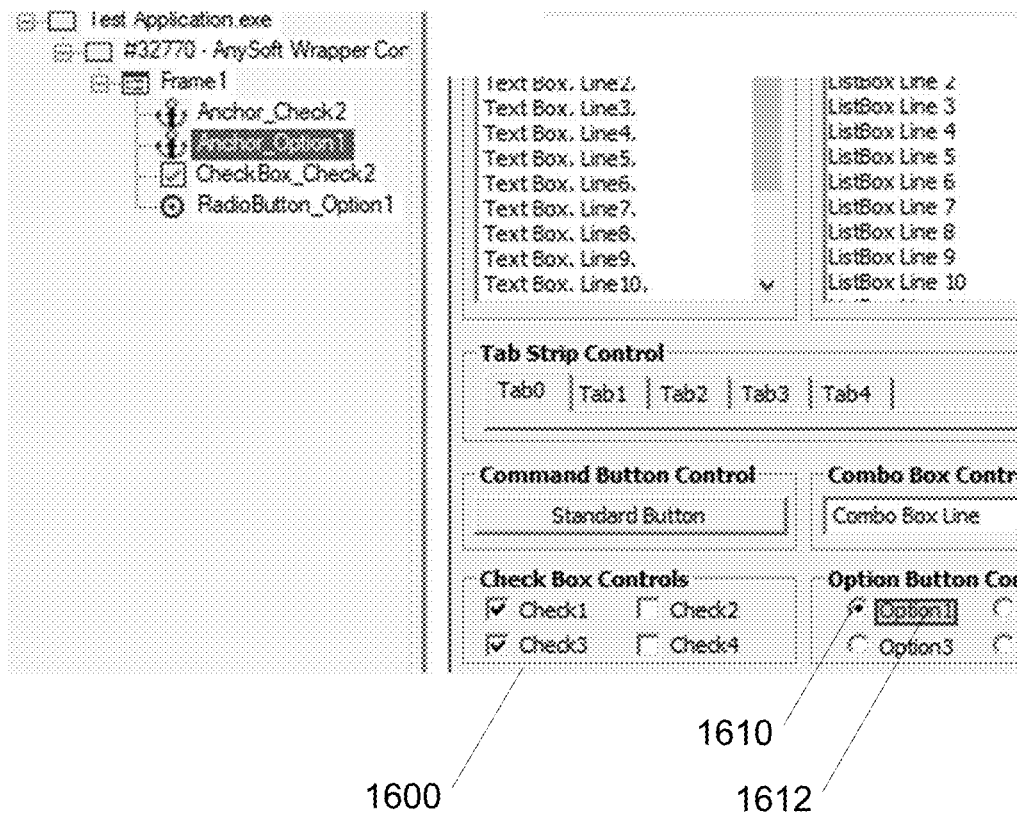
FIG. 16 depicts a part of a design-time application image with an example of a check box or radio button control and an anchor automatically identified for the radio button control, according to embodiments of the invention.

According to some embodiments, identifying by the processor an anchor for a control object that is one of check box and a radio button may include selecting content image located nearest (e.g. when measured on the display, for example in units of pixels or other distance measures) to the control. FIG. 16 depicts a part of a design-time application image 1600 with an example of a check box or radio button control 1610 and an anchor 1612 automatically identified for radio button control 1610, according to embodiments of the invention. In this example, the anchor 1612 automatically identified for radio button control 1610 includes a bounding rectangle of the text closest to radio button control 1610. Thus, an image including the word "Option1" as it appears on design-time application image 1600 may be stored and later used as anchor 1612.

Figure 17:
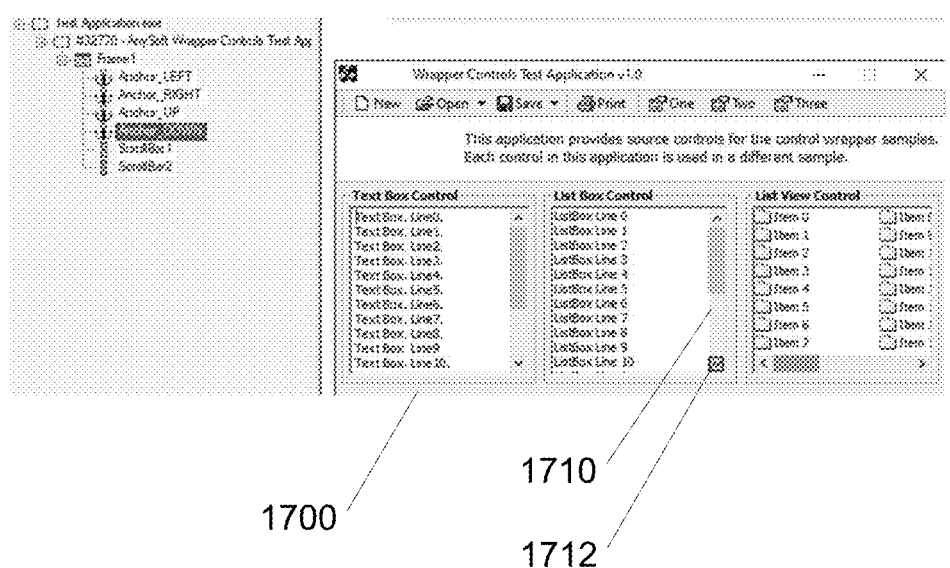
FIG. 17 depicts a part of a design-time application image with an example of a scrollbar control and an anchor automatically identified for the scrollbar control, according to embodiments of the invention.

According to some embodiments, identifying by the processor an anchor for a control object that is a scrollbar object may include selecting image of a scrollbar button. FIG. 17 depicts a part of a design-time application image 1700 with an example of a scrollbar control 1710 and an anchor 1712 automatically identified for scrollbar control 1710, according to embodiments of the invention. In this example, the anchor 1712 automatically identified for scrollbar control 1710 includes an image of a scrollbar button. Thus, an image including the scrollbar button as it appears on design-time application image 1700 may be stored (e.g., in database 135) and later used as anchor 1712.

According to some embodiments, scrollbar controls may be identified or found by the processor using, for example operations such as:

Obtaining an application image (e.g., a design-time application image).

Creating a pattern dictionary of a variety of images of scrollbars, including for example horizontal or left-right scrollbars and vertical or top-bottom scrollbars.

Binarizing the images of the scrollbars for example by applying AdaptiveThreshold function of the OpenCV library.

Creating a Sels dictionary for possible scrollbars by generating a binary structuring element (Sel) for each image of a scrollbar, for example, using functions such as PixGenerateSelRandom or PixGenerateSelWithRuns from Leptonica SDK (Leptonica is an open source library containing a set of functions for processing and analysis images).

Binarizing the run-time application image for example using OpenCV function AdaptiveThreshold and converting the result to Leptonica binary format.

Finding locations in the run-time application image that match the patterns from the Sels dictionary for example, using Leptonica based function PixFindMatchedPatterns.

Finding the nearest left and right arrows or forelocks pairs for horizontal scrollbars and top and bottom arrows or forelocks pairs for vertical scrollbars.

Finding or determining a bounding shape for each scrollbar, e.g., scrollbars rectangles.

Figure 18:
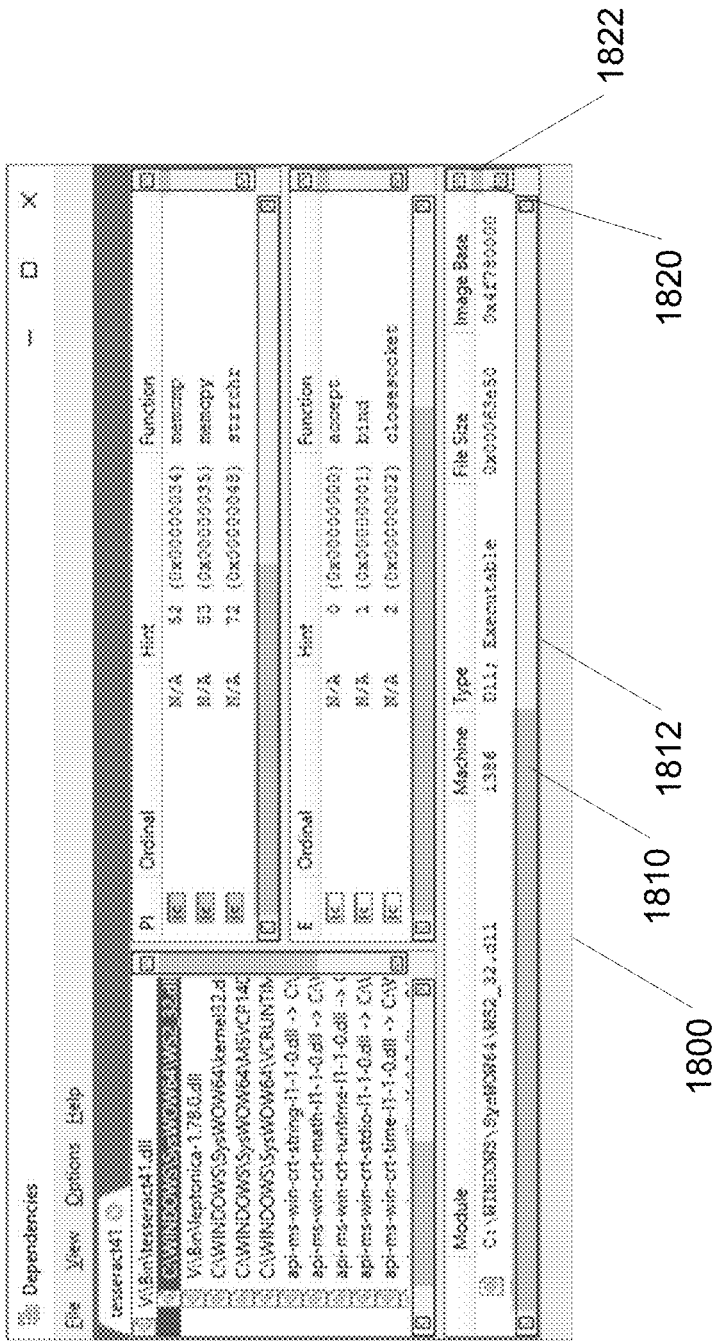
FIG. 18 depicts a part of a design-time application image with an example of scrollbars and scrollbars rectangles, according to embodiments of the invention.

FIG. 18 depicts a part of a design-time application image 1800 with an example of scrollbars and scrollbar rectangles, according to embodiments of the invention. For example, scrollbar rectangle 1812 is identified for horizontal scrollbar 1810, and scrollbar rectangle 1822 is identified for vertical scrollbar 1820.

Figure 19:
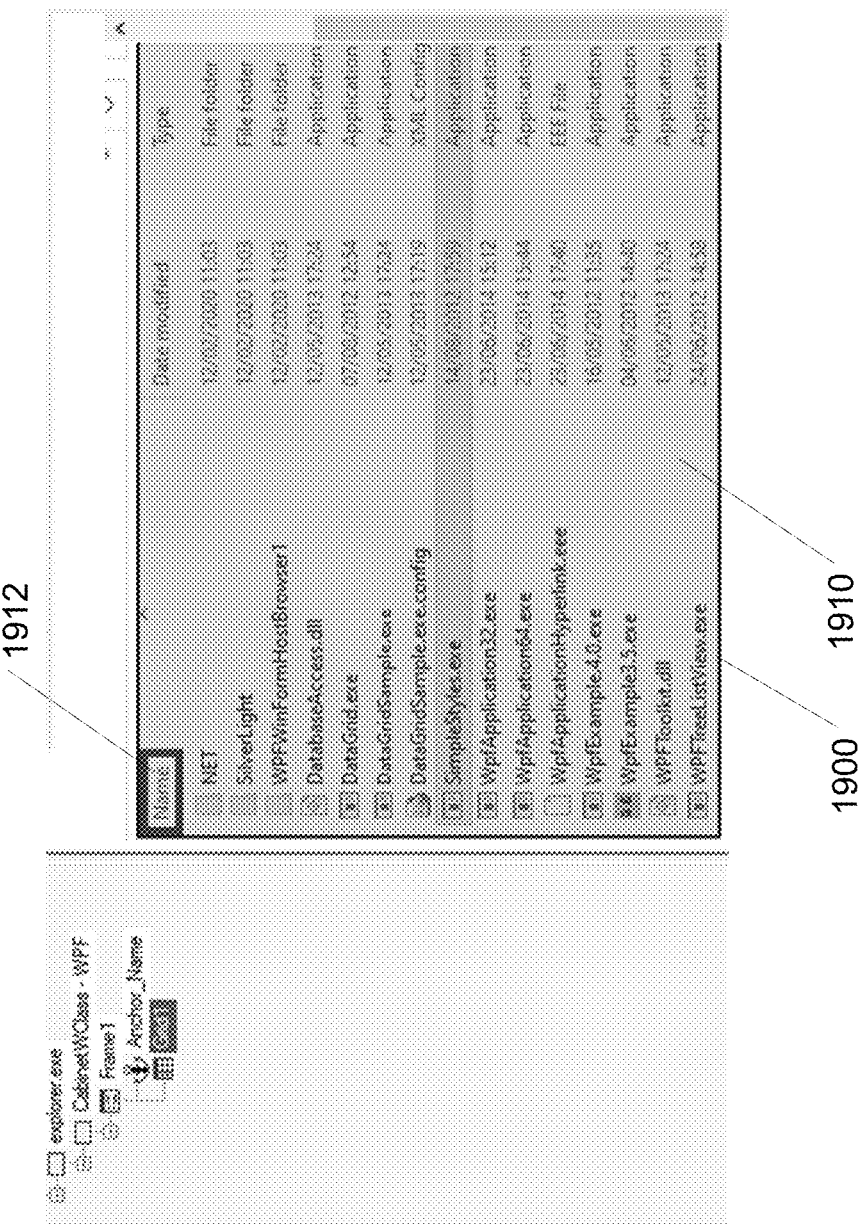
FIG. 19 depicts a part of a design-time application image with an example of a table control and an anchor automatically identified for the table control, according to embodiments of the invention.

According to some embodiments, identifying an anchor for a control object that is a table may include selecting an image of content of a header cell. FIG. 19 depicts a part of a design-time application image 1900 with an example of a table control 1810 and anchor 1912 automatically identified for table control 1910, according to embodiments of the invention. In this example, the anchor 1912 automatically identified for table control 1910 includes an image of a content of a header cell, e.g., the top left header for languages that are written from left to right. Thus, an image including the content of a header cell as it appears on design-time application image 1900, in this example, an image of the word "Name", may be stored and later used as anchor 1912.

According to embodiments of the invention, identifying an anchor for a control object may include selecting an image of text or an icon that is located inside a bounding shape object that defines the control or is nearest to the bounding shape object that defines control. For example, selecting an image of text or icon that is located nearest to the control may be performed for controls or types of controls for which embodiments described with relation to FIGS. 14-19 have failed to detect or identify an anchor. According to some embodiments, selecting, by the processor, an image of text or icon that is located nearest to the control may include performing example operations such as:

- Binarizing the design-time application image for example by applying AdaptiveThreshold function of the OpenCV library.
- Detecting bounding rectangles of words and icons in the binarized design-time application image, for example, by applying Leptonic GetWordsInTextlines function (e.g., a function that returns rectangles of words in an image).
- Excluding rectangles of other controls and shapes of the same level in the shape tree from the list of rectangles (e.g., shapes of other controls).
- Finding the nearest bounding rectangles, typically by scanning the design time image from the left to the right and from the top to the bottom. Typically, a control located nearest to the top-left corner of the control may be selected.
- For right to left languages, e.g., Hebrew and Arabic, the search sequence may be from the right to the left and from the top to the bottom. Typically, a control located nearest to the top-right corner of the control may be selected.

Figure 20:
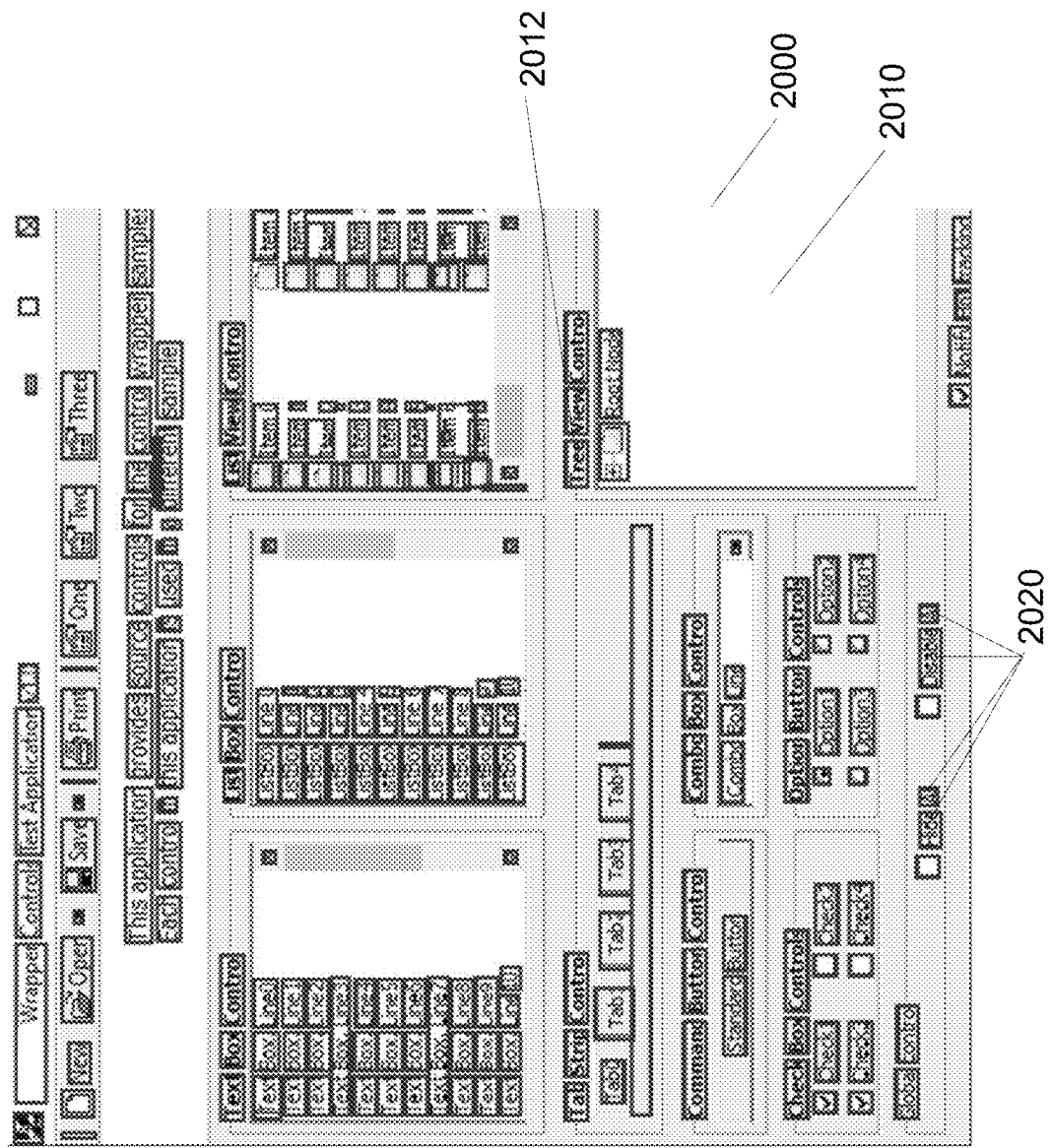
FIG. 20 depicts a part of a design-time application image with an example of detected bounding rectangles of words and icons, according to embodiments of the invention.

FIG. 20 depicts a part of a design-time application image 2000 with an example of detected bounding rectangles of words and icons 2020, according to embodiments of the invention. In this example, the anchor 2012 automatically identified for window 2010 includes an image of a content of bounding rectangle 2012, e.g., the bounding rectangle located closest to the top left corner of window 2010. Thus, an image including the content of bounding rectangle 2012 as it appears on design-time application image 2000, in this example, an image of the word "Tree" may be stored and later used as anchor 2012.

According to some embodiments, operations 1388-1392 may be performed during normal and routine operation of the application, e.g., at run-time mode. In operation 1388 a run-time application image displaying on the local display may be captured. According to some embodiments, operation 1388 may be performed periodically, e.g., each 0.5, 1 or 1.5 seconds and/or when a change is sensed in the GUI. In operation 1390, an anchor, e.g., the anchor identified in operation 1384 and stored in operation 1386, may be identified, found or detected within the run-time application image. For example, the anchor may be identified in the run-time application image using the matchTemplate function from the OpenCV library. The matchTemplate function searches for a smaller image (up to same size image) within a larger image and returns the location of the smaller image in the larger image if found. The matchTemplate function may also return a match or similarity score, indicative of the similarity between the searched and found anchor. In operation 1392, the control object may be identified within the run-time application image based on the anchor. For example, the geometric relationships between a control and the anchor (stored in operation 1386) may be used to identify the control once the location of the anchor is known. A plurality of anchors and respective controls may be found.

Figure 21:
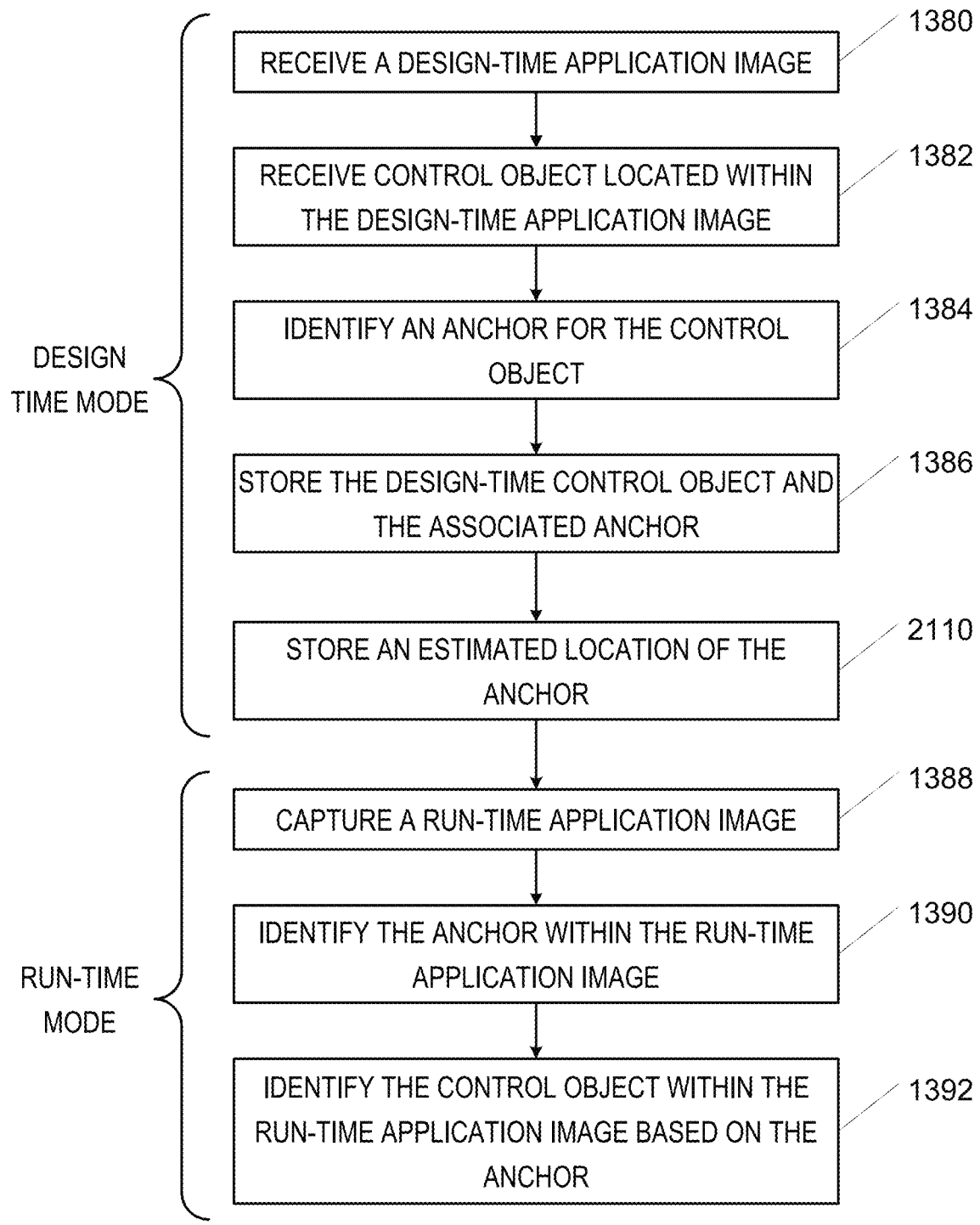
FIG. 21 is a flowchart of a variant of a method for enabling graphic-based interoperability with an application executed on a remote computer remote to a computer including a local processor, and displayed on a local display, according to embodiments of the invention.

Reference is now made to FIG. 21 which is a flowchart of a variant of the method for enabling graphic-based interoperability with an application executed on a remote computer (e.g., system server 110) remote to a local computer (e.g., user device 140) including a local processor (e.g., user processor 145), and displayed on a local display (e.g., output devices 170), according to embodiments of the invention. While in some embodiments the operations of FIG. 21 are carried out using systems as shown in FIG. 1, in other embodiments other systems and equipment can be used.

Figure 22:
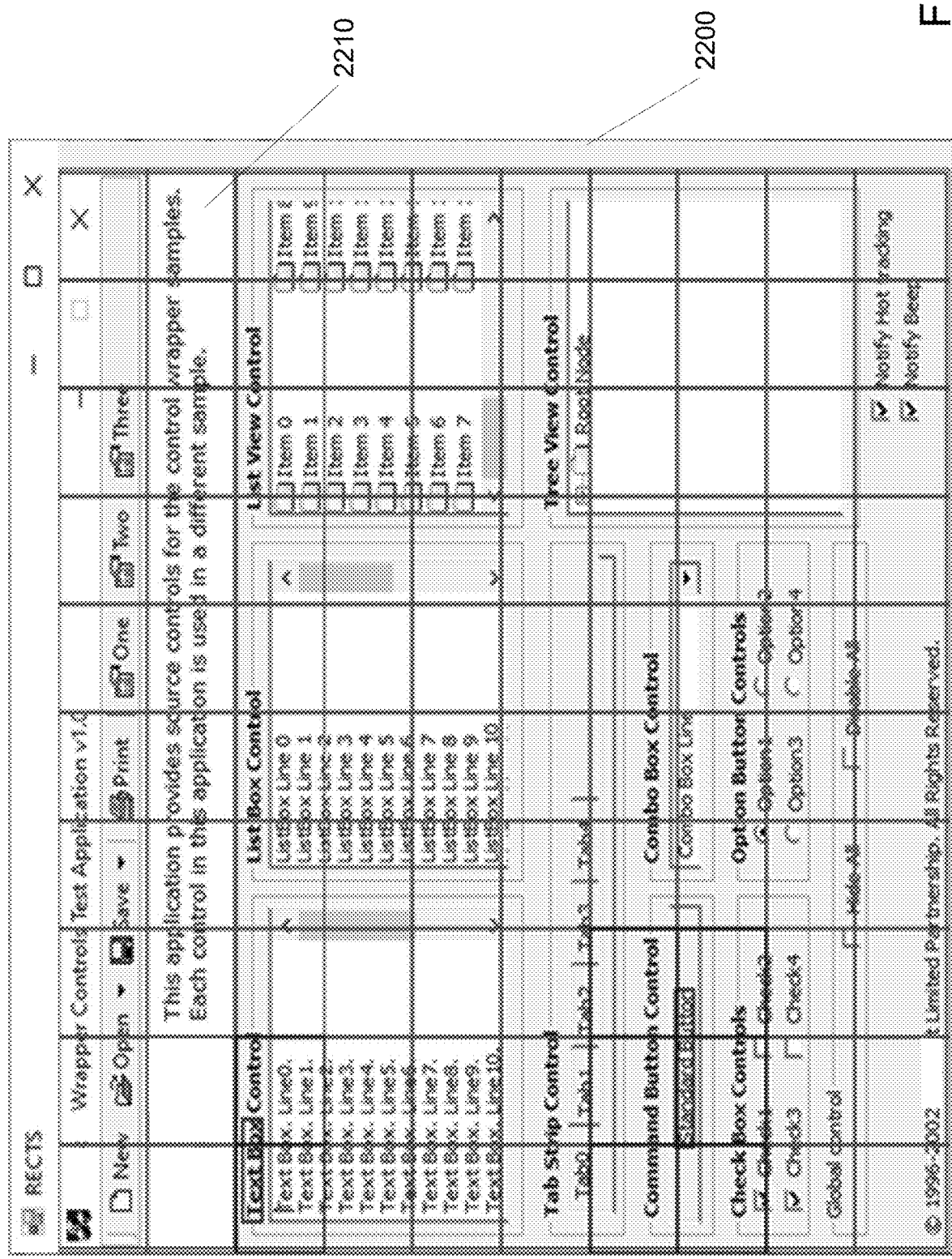
FIG. 22 depicts a part of a design-time application image that is divided into segments, according to embodiments of the invention.

According to some embodiments, the operations of FIG. 21 are carried out using a local processor. According to embodiments of the method presented in FIG. 21, operations 1380-1392 are carried out similarly as described elsewhere herein, and operation 2110 is added to the embodiments of the method presented in FIG. 13. In operation 2110 an estimated location of the anchor in the design-time application image may be stored. According to one embodiment, coordinates of the anchor in the design-time application image may be stored. According to some embodiments, the design-time application image may be divided into segments and the one or more segments containing the anchor may be identified, found or determined and stored. Thus, identifying the anchor within the run-time application image in operation 1390 may include searching for the anchor starting from the estimated location, e.g., from the stored coordinates or the stored segments. For example, the run-time image may be divided into segments that are equivalent to the segments of the design-time image, and the anchor may be searched first in the stored segments (or in an area that is slightly larger than the stored segments). According to some embodiments, dividing the design-time or run-time application image into segments may include dividing the design-time or run-time application image into N*N rectangular segments, where N is an integer larger than one. FIG. 22 depicts a part of a design-time application image 2200 that is divided into segments 2210, according to embodiments of the invention.

Figure 23:
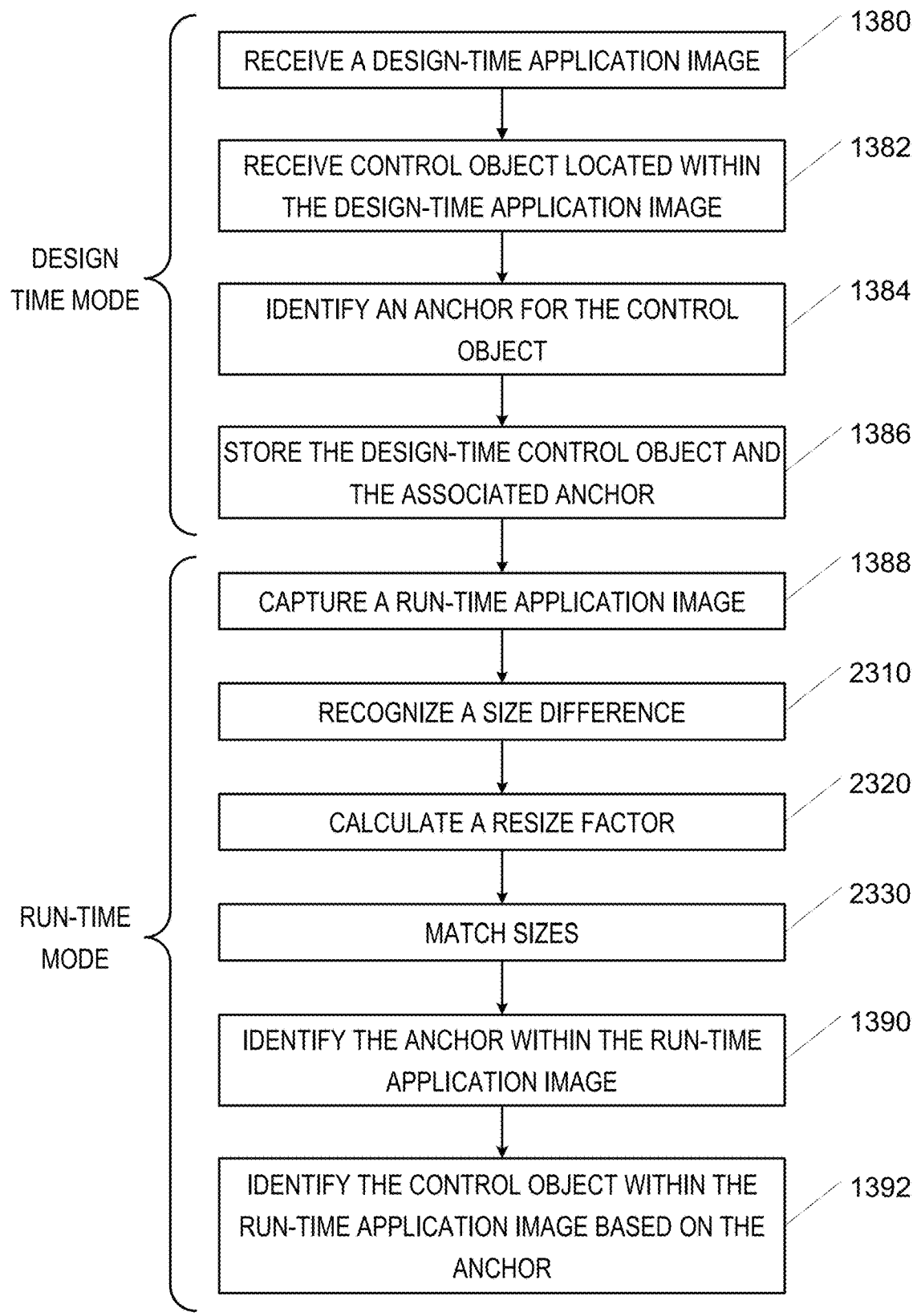
FIG. 23 is a flowchart of a variant of a method for enabling graphic-based interoperability with an application executed on a remote computer remote to a local computer including a local processor, and displayed on a local display, according to embodiments of the invention.

Reference is now made to FIG. 23 which is a flowchart of a variant of the method for enabling graphic-based interoperability with an application executed on a remote computer (e.g., system server 110) remote to a local computer (e.g., user device 140) including a local processor (e.g., user processor 145), and displayed on a local display (e.g., output devices 170), according to embodiments of the invention. While in some embodiments the operations of FIG. 23 are carried out using systems as shown in FIG. 1, in other embodiments other systems and equipment can be used.

According to some embodiments, the operations of FIG. 23 are carried out using a local processor. According to embodiments of the method presented in FIG. 23, operations 1380-1392 are carried out similarly as described elsewhere herein, and operations 2310-2330 are added to the embodiments of the method presented in FIG. 13. In operation 2310 the processor may determine, identify or infer that the size of the run-time application image is different from the size of the design-time application image, e.g., that the run-time application image is increased or decreased relatively to the run-time application image. According to some embodiments, the local processor may determine, identify or infer that the size of the run-time application image is different from the size of the design-time application image by matching or comparing the run-time application image with one or more anchors, and generating a match score indicative of the similarity between the run-time application image and the one or more anchors. For example, a matchTemplate function may be used to compare or match the run-time application image with the one or more anchors and to calculate or provide the match score. Other methods may be used. According to some embodiments, the local processor may perform operation 2310 for each run-time image that is obtained in operation 1388. According to some embodiment, the local processor may perform operation 2310 if the local processor fails to identify anchors, e.g., in operation 1390.

For example, a user of the application in run-time may use zoom-in or zoom-out to increase or decrease the size or resolution of an application image during run-time according to preferences of the user. Thus, if the application or GUI of the local processor enables zooming in and zooming out, then the size of the run-time application image may be different from the size of the design-time application image, and specifically, the size of the anchors in the run-time application image may be different from the size of the same anchors taken from the design-time application image, e.g., increased or decreased by a scaling factor. Thus, trying to detect or identify the anchors within the run-time application image may provide false negative results. Therefore, to identify the anchors that were stored during the design time, it may be required to match the sizes of the stored anchors to the size of the same anchors in the run-time application image, e.g. to alter the size of one of the two so that the sizes of the two are equivalent or similar, by some measure. To do that, it may be first required to know the scaling factor, which is not provided from the application at run-time.

Therefore, in operation 2320, a resize factor for the run-time application image relatively to the design-time application image may be calculated or found, e.g., by the local processor. In some embodiments, calculating the resize factor may include resizing the run-time application image or the one or more anchors found in the design phase, using an initial resize factor, e.g., an initial guess. According to some embodiments, resizing the run-time application image or the one or more anchors may include only zooming out (e.g., decreasing in size) either the run-time application image or the one or more anchors. Zooming in or increasing in size an image may cause visual inference, e.g., blurring of the increased image. Thus, in some embodiments zooming in one of the images in operation 2320 is avoided. The resized, e.g., zoomed out or decreased, run-time application image may be matched or compared to the one or more anchors, or the resized, e.g., zoomed out or decreased, one or more anchors may be matched or compared to the run-time application image (depending on which image has been resized) and a match score may be calculated (e.g., using the matchTemplate function or other method that compares the images and provides the match score). The resizing and matching may be repeated with various or different resize factors, e.g., the local processor may perform a search over different resize factors or over a range of possible resize factors, until the match score meets a criterion, e.g., until the match score is below a threshold. The resize factor that provides the match score that meets the criterion may be selected.

According to some embodiments, the local processor may calculate the resize factor by first searching over resize factors that zoom out the run-time application image. The search may be performed by zooming out the run-time application image using an initial guess of a resize factor, matching the zoomed-out run-time application image with the original size one or more anchors to calculate a match score and repeating the resizing and matching with different resize factors. If the match score that meets a criterion, the resize factor that provided the match score that met the criterion is selected. If none of the tested resize factors provides a match score that meets the criterion a failure to find a resize factor by zooming out the run-time application image is declared. If a failure to find a resize factor by zooming out the run-time application image is declared, then the local processor may calculate the resize factor by searching over resize factors that zoom out the one or more anchors. The search may be performed by zooming out the one or more anchors using an initial guess of a resize factor, matching the zoomed out one or more anchors with the original size run-time application image to calculate a match score and repeating the resizing and matching with different resize factors. If a match score meets a criterion, the resize factor that provided the match score that met the criterion is selected. If none of the tested resize factors provides a match score meets the criterion a failure to find a resize factor is declared.

According to some embodiments the search over a range of resize factors may include calculating a resize factor from an interval or range of possible resize factors. The search may include performing one or more iterations, where in each iteration a step size and a range of possible resize factors may be selected, and one or more candidate resize factors may be generated or calculated using the step size and range of possible resize factors. For example, the searched range may be [0-1], [0-2], etc., and the initial step size may be 0.05, 0.1, 0.2, etc. The one or more candidate resize factors may be generated as an arithmetic progression of candidate resize factors that are bounded in the range of possible resize factors with a common difference that equals the step size. For example, a first candidate resize factor may equal the minimal value from the interval or range of possible resize factors, a second candidate resize factor may equal the first candidate resize factor plus the step size, a third candidate resize factor may equal the second candidate resize factor plus the step size, etc., until the largest candidate resize factor that is not larger than the maximal value from the interval or range of possible resize factors is reached.

In a first set of iterations, the range of possible resize factors may include candidate resize factors that zoom out the run-time application image. To perform the search, each of the candidate resize factors may be used to zoom out the run-time application image. Each of the zoomed-out run-time application images may be matched or compared with the design-time application image and a match score may be calculated for each of the candidate resize factors. For each consecutive iteration, the step size may be reduced by a reduction factor, e.g., by a factor of 5, 10, 20, etc. In some embodiments the range of possible resize factors may be reduced as well so that the search would continue in the following iteration in a range that is closer to the candidate resize factor that provided the best results in the current iteration than the range before the reduction. For example, if the range on the first iteration is [0-1], the resize factor is 10 and the step size is 0.1, then the candidate resize factors of the first iteration would be 0, 0.1, 0.2, 0.3, 0.4, 0.5, 0.6, 0.7, 0.8, 0.9 and 1. If for example, the candidate resize factor that provided the best match score was 0.5, then in a next iteration the range would be 0.45-0.55 and the step size would be 0.01. According to embodiments of the invention, reducing the step size at each consecutive iteration may improve the accuracy of the search and reducing the range of possible resize factors at each consecutive iteration may dramatically improve the efficiency and dramatically reduce the computational power required for finding the resize factor. Combining reducing the range of possible resize factors with deceasing the step size at each iteration, embodiments of the invention may provide an accurate and efficient search.

The iterations may be repeated until a maximal match score of a current iteration equals (or substantially equals) a maximal match score of a previous iteration, or until the maximal match score is above a threshold, and the candidate resize factor that provided the maximal match score may be selected and used. If the maximal match score in a current iteration is lower than the maximal match score in a previous iteration, the algorithm terminates, and it may be determined or concluded that no resize factor that zooms out the run-time application image was found.

In some implementations, user configuration may allow only zooming in to the run-time application image by the user during run-time. In this case, only the first set of iterations may be performed. In some implementations, however, the user may either zoom in or zoom out the run-time application image. In this case, a second set of iterations may be required if no resize factor that zooms out the run-time application image was found in the first set of iterations, which could mean that the user had zoomed out the run-time application image.

If no resize factor that zooms out the run-time application image was found in the first set of iterations, then a second set of iterations may be performed. In the second set of iterations, the range of possible resize factors may include candidate resize factors that zoom out the one or more anchors. To perform the search, each of the candidate resize factors may be used to zoom out the one or more anchors. Each of the zoomed-out one or more anchors may be matched or compared with the run-time application image and a match score may be calculated for each of the candidate resize factors. For each consecutive iteration, the step size may be reduced by a factor. In some embodiments the range of possible resize factors may be reduced as well so that the search would continue in the following iteration in a range that is close to the candidate resize factor that provided the best results in the current iteration. The iterations may be repeated until a maximal match score of a current iteration equals (or substantially equals) a maximal match score of a previous iteration, or until the maximal match score is above a threshold, and the candidate resize factor that provided the maximal match score may be selected and used. If the maximal match score in a current iteration is lower than the maximal match score in a previous iteration, the algorithm terminates, and it may be determined or concluded that no resize factor was found.

In the following example embodiments of the method for finding a resize factor in either the first or second set of iterations is demonstrated. In this example, the matchTemplate function is used to compare or match the run-time application image with the one or more anchors. In the first set of iterations the run-time application image is zoomed out using the candidate resize factors and in the second set of iterations the one or more anchors is zoomed out candidate resize factors. The result of the matchTemplate function is used as the match score. other methods may be used to calculate the match score. For example, let x be the range of possible resize factors where $x \subset [0.0,1.0]$, let matchTemplate function be denoted as $f(x)$, $x \subset [0.0,1.0]$. Thus, the problem may be defined as finding x that corresponds to max $[f(x)]$. The initial step size is selected to be 0.5. In a first iteration, $f(x)$ is calculated for x=x+step_size in [0.0,1.0]. Further, let n denote the iteration number. In each iteration, a maximal match score, denoted maxvalue(n) is calculated. If maxvalue(n) is above a threshold, maxvalue(n)>threshold, then the candidate resize factor that provided the maximal match score is selected as the resize factor. Else, for a subsequent iteration, the range of possible resize factors is scaled to be x=[max (0, maxvalue(n)−2*$step_{size}$), [max (maxvalue(n)+2*$step_{size}$, 1)], and the step size is scaled to be step_size=step_size/10. If the maximal match score in a current iteration is lower than the maximal match score in a previous iteration maxvalue(n−1)>maxvalue(n) the algorithm terminates with an error result. If, the maximal match score in a current iteration equals the maximal match score in a previous iteration maxvalue(n−1)=maxvalue(n) the algorithm terminates and the candidate resize factor that provided the maximal match score in the current iteration is selected as the resize factor.

In operation 2330, the selected resize factor may be used to match the sizes of the anchors to the size of the run-time application image, e.g., to the size of the same anchors in the run-time application image. Depending on the resize factor, matching the sizes of the anchors to the size of the same anchors in the run-time application image may include resizing, e.g., zooming out the run-time application image or the anchors using the selected resize factor or the stored anchors, e.g., the anchors identified in operation 1384 during the design time.

According to embodiments of the invention, the processor may detect if a control is editable or not during run-time mode based on a mouse pointed type. In some embodiments, the processor may detect if a control is editable or not during run-time mode by hovering or moving an emulated mouse (e.g., a mouse emulated by the processor as opposed to controlled by a user) over the control, and obtaining cursor information and the mouse pointer type. For example, the mouse pointer type may be provided by the operating system. In some embodiments, the mouse pointer type when the mouse is located over the control may indicate whether the control is editable or not. For example, in some implementations, if the mouse pointer type is "beam", then the control is editable. Otherwise, the control is not editable.

According to embodiments of the invention, the processor may detect if a control is enabled or disabled in run-time mode. As a preparation step, during design time mode, the processor may calculate or find the dominant, representative or average color of the image of the design time control image, for example, using the GetDominantColor function on the image of the design time control. During run-time mode, the processor may obtain the image of the control, e.g., using the Leptonica GetWordsInTextlines function. The processor may calculate or find the dominant, representative or average color of the image of the control at run-time, for example, using the GetDominantColor function. The processor may compare the dominant color of the image of the design time control image with the dominant color of the image of the control at run-time. If the colors match (e.g., if the difference is lower than a threshold) then it may be concluded that the control is enabled. If, however, the colors do not match (e.g., if the difference is not lower than a threshold), then it may be concluded that the control is not enabled.

Unless explicitly stated, the method embodiments described herein are not constrained to a particular order or sequence. Furthermore, all formulas described herein are intended as examples only and other or different formulas may be used. Some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as falling within the true spirit of the invention.

Various embodiments have been presented. Each of these embodiments may of course include features from other embodiments presented, and embodiments not specifically described may include various features described herein.

The invention claimed is:

1. A method for enabling graphic-based interoperability with an application executed on a remote computer remote to a local computer comprising a local processor, and displayed on a local display, the method comprising, using the local processor:
   during a design-time mode:
      receiving a design-time application image and a control object located within the design-time application image;
      identifying an anchor for the control object; and
      storing the design-time control object and the associated anchor; and
   during a run-time mode:
      capturing a run-time application image displaying on the local display;
      identifying the anchor within the run-time application image; and
      identifying the control object within the run-time application image based on the anchor.

2. The method of claim 1, wherein the anchor represents a visual object in the design-time application image having content which remains constant from the design-time mode to the run-time mode, and wherein the control object represents a controllable object located within the design-time and run-time application images.

3. The method of claim 1, wherein the control object is one of a button, a link, a check box, a radio button, a scrollbar or a table, wherein:
   if the control object is a button or a link, then identifying the anchor for the control object comprises selecting content image located inside a bounding shape object that defines the control;
   if the control object is a check box or a radio button, then identifying the anchor for the control object comprises selecting content image located nearest to the control;
   if the control object is a scrollbar, then identifying the anchor for the control object comprises selecting at least one image of a scrollbar button;
   if the control object is a table, then identifying the anchor for the control object comprises selecting image of content of a header cell.

4. The method of claim 1, wherein identifying the anchor for the control object comprises selecting an image of text or icon that is located inside a bounding shape object that defines the control or is nearest to the control.

5. The method of claim 1, comprising:
   during the design-time mode, storing an estimated location of the anchor in the design-time application image, wherein identifying the anchor within the run-time application image comprises searching for the anchor starting from the estimated location.

6. The method of claim 5, wherein storing estimated location of the anchor in the design-time application image comprises:
   dividing the design-time application image into segments;
   identifying the one or more segments containing the anchor; and
   storing the identified segments,
   wherein searching for the anchor starting from the estimated location in the run-time application image comprises searching for the anchor staring in the location of the identified segments.

7. The method of claim 1, wherein identifying the anchor within the run-time application image comprises identifying the visual object of the anchor within the run-time application image.

8. The method of claim 1, wherein identifying the anchor within the run-time application image comprises:
   during the run-time mode:
      calculating a resize factor for the run-time application image or the anchor;
      matching the size of the run-time application image to the size of the visual object of the anchor using the resize factor; and
      identifying the visual object of the anchor within the run-time application image.

9. The method of claim 8, wherein calculating a resize factor comprises:
   resizing one of the run-time application image or the anchor using an initial resize factor;
   matching the resized run-time application image to the anchor or the resized anchor to the run-time application image and calculating a match score;
   repeating resizing and matching with different resize factors until the match score meets a criterion; and
   selecting the resize factor that provided the match score that meets the criterion.

10. The method of claim 8, wherein calculating a resize factor from a range of possible resize factors comprises:
    in each iteration:
       selecting a step size for generating a plurality of resize factors within the range of possible resize factors;
       resizing the run-time application image using the generated resize factors;
       for each resize factor, matching the resized run-time application image to the anchor and calculating a match score;
       reducing the step size;
       reducing the range of possible resize factors to be closer, than the range before reduction, to the resize factor that provided a maximal match score in the current iteration;

repeating the iterations until a maximal match score of a current iteration equals a maximal match score of a previous iteration or until the match score is above a threshold; and selecting the resize factor that provided the maximal match score.

11. The method of claim 8, wherein calculating a resize factor comprises:

in each iteration of a first set of iterations:
selecting a first step size for generating a plurality of first resize factors within a first range of possible resize factors;
resizing the run-time application image using the generated first resize factors;
for each first resize factor, matching the resized run-time application image to the anchor and calculating a match score;
if the maximal match score in the current iteration is lower than the maximal match score in the previous iteration then performing a second set of iterations;
else:
reducing the first step size;
reducing the range of possible resize factors to be closer, than the range before resizing, to the resize factor that provided a maximal match score in a current iteration; and
repeating the iterations until the maximal match score in the current iteration equals a maximal match score of a previous iteration or until the match score is above a threshold;
wherein each iteration of the second set of iterations comprises:
selecting a second step size for generating a plurality of second resize factors within a second range of possible resize factors;
resizing the anchor using the generated second resize factors;
for each second resize factor, matching the resized anchor to the run-time application image and calculating the match score;
if the maximal match score in the current iteration is lower than the maximal match score in the previous iteration then terminating with an error result;
else:
reducing the second step size;
reducing the second range of possible resize factors to be closer, than the range before the reduction, to the second resize factor that provided the maximal match score in the current iteration; and
repeating the iterations of the second set of iterations until the maximal match score in the current iteration equals the maximal match score of a previous iteration or until the maximal match score is above the threshold; and
selecting one of the first resize factors or the second resize factors that provided the maximal match score.

12. The method of claim 8, wherein calculating a resize factor comprises:

resizing the run-time application image using an initial resize factor;
matching the resized run-time application image to the anchor and calculating a match score;
repeating resizing and matching with different resize factors;
if a match score that meets a criterion is found, then selecting the resize factor that provided the match score that meets the criterion;

else:
resizing the anchor using an initial resize factor;
matching the resized anchor to the run-time application image and calculating a match score;
repeating resizing and matching with different resize factors;
if a match score that meets a criterion is found, then selecting the resize factor that provided the match score that meets the criterion; and
else, terminating with an error result.

13. A system for enabling graphic-based interoperability with an application executed on a remote computer, comprising:

a local computer remote to the remote computer, the local computer comprising:
a memory;
a local display; and
a local processor configured to:
during a design-time mode:
display a design-time application image on the local display;
capture the design-time application image;
receive a control object located within the design-time application image;
identify an anchor for the control object; and
store the design-time control object and the associated anchor; and
during a run-time mode:
display a run-time application image on the local display;
capture the run-time application image displaying on the local display;
identify the anchor within the run-time application image; and
identify the control object within the run-time application image based on the anchor.

14. The system of claim 13, wherein the control object is one of a button, a link, a check box, a radio button, a scrollbar or a table, wherein:

if the control object is a button or a link, then the local processor is configured to identify the anchor for the control object by selecting content image located inside a bounding shape object that defines the control;
if the control object is a check box or a radio button, then the local processor is configured to identify the anchor for the control object by selecting content image located nearest to the control;
if the control object is a scrollbar, then the local processor is configured to identify the anchor for the control object by selecting at least one image of a scrollbar button; and
if the control object is a table, then the local processor is configured to identify the anchor for the control object by selecting image of content of a header cell.

15. The system of claim 13, wherein the local processor is configured to identify the anchor for the control object by selecting an image of text or icon that is located inside a bounding shape object that defines the control or is nearest to the control.

16. The system of claim 13, wherein the local processor is configured to:

during the design-time mode, store an estimated location of the anchor in the design-time application image; and
identify the anchor within the run-time application image by searching for the anchor starting from the estimated location.

17. The system of claim 16, wherein the local processor is configured to:
- store the estimated location of the anchor in the design-time application image by:
  - dividing the design-time application image into segments;
  - identifying the one or more segments containing the anchor; and
  - storing the identified segments; and
- search for the anchor starting from the estimated location in the run-time application image by searching for the anchor staring in the location of the identified segments.

18. The system of claim 13, wherein the local processor is configured to identify the anchor within the run-time application image by:
- during the run-time mode:
  - calculating a resize factor for the run-time application image or the anchor;
  - matching the size of the run-time application image to the size of the visual object of the anchor using the resize factor; and
  - identifying the visual object of the anchor within the run-time application image.

19. The system of claim 18, wherein the local processor is configured to calculate a resize factor from a range of possible resize factors by:
- in each iteration:
  - selecting a step size for generating a plurality of resize factors within the range of possible resize factors;
  - resizing the run-time application image using the generated resize factors;
  - for each resize factor, matching the resized run-time application image to the anchor and calculating a match score;
  - reducing the step size;
  - reducing the range of possible resize factors to be closer to the resize factor that provided a maximal match score in the current iteration;
  - repeating the iterations until a maximal match score of a current iteration equals a maximal match score of a previous iteration or until the match score is above a threshold; and
- selecting the resize factor that provided the maximal match score.

20. The system of claim 18, wherein the local processor is configured to calculate a resize factor from a range of possible resize factors by:
- in each iteration of a first set of iterations:
  - selecting a step size for generating a plurality of resize factors within the range of possible resize factors;
  - resizing the run-time application image using the generated resize factors;
  - for each resize factor, matching the resized run-time application image to the anchor and calculating a match score;
  - reducing the step size;
  - reducing the range of possible resize factors to be closer than the range before reducing to the resize factor that provided a maximal match score in a current iteration;
  - repeating the iterations until the maximal match score in the current iteration equals a maximal match score of a previous iteration or until the match score is above a threshold or until the maximal match score in the current iteration is lower than the maximal match score in the previous iteration;
- if the maximal match score in the current iteration equals the maximal match score of the previous iteration or the match score is above the threshold then selecting the resize factor that provided the maximal match score; and
- if the maximal match score in the current iteration is lower than the maximal match score in the previous iteration then performing a second set of iterations,
- wherein each iteration of the second set of iterations comprises:
  - selecting a second step size for generating a plurality of second resize factors within a second range of possible resize factors;
  - resizing the anchor using the generated second resize factors;
  - for each second resize factor, matching the resized anchor to the run-time application image and calculating the match score;
  - reducing the second step size;
  - reducing the second range of possible resize factors to be closer than the range before reducing to the second resize factor that provided the maximal match score in the current iteration;
  - repeating the iterations of the second set of iterations until the maximal match score in the current iteration equals the maximal match score of a previous iteration or until the maximal match score is above the threshold or until the maximal match score in the current iteration is lower than the maximal match score in the previous iteration;
  - if the maximal match score in the current iteration equals the maximal match score of the previous iteration or the match score is above the threshold then selecting the second resize factor that provided the maximal match score; and
  - if the maximal match score in the current iteration is lower than the maximal match score in the previous iteration then terminating with an error result.

* * * * *